(12) United States Patent  (10) Patent No.: US 8,211,259 B2
Sato et al.  (45) Date of Patent: Jul. 3, 2012

(54) SEPARATING METHOD OF BONDED BODY

(75) Inventors: Mitsuru Sato, Suwa (JP); Takatoshi Yamamoto, Suwa (JP); Shintaro Asuke, Suwa (JP); Yoshiaki Mori, Suwa (JP); Kazuhiro Gomi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 12/323,562

(22) Filed: Nov. 26, 2008

(65) Prior Publication Data

US 2009/0133820 A1 May 28, 2009

(30) Foreign Application Priority Data

Nov. 28, 2007 (JP) .................................. 2007-307619

(51) Int. Cl.
 *B29C 65/00* (2006.01)
(52) U.S. Cl. ........ 156/247; 156/711; 156/712; 156/752; 156/753
(58) Field of Classification Search .................. 156/711, 156/712, 752, 753, 247
 See application file for complete search history.

(56) References Cited

U.S. PATENT DOCUMENTS

| 4,137,365 A * | 1/1979 | Fletcher et al. ............... 428/412 |
| 5,946,433 A * | 8/1999 | Yamamoto et al. ............. 385/36 |
| 6,761,947 B2 * | 7/2004 | Yamakawa et al. .......... 428/40.1 |
| 2005/0113479 A1 * | 5/2005 | Eckberg ......................... 522/109 |
| 2005/0173059 A1 * | 8/2005 | Ringleben et al. ............. 156/291 |
| 2006/0126189 A1 * | 6/2006 | Takahashi ...................... 359/642 |
| 2006/0201601 A1 * | 9/2006 | Furst et al. ....................... 156/60 |
| 2007/0098879 A1 * | 5/2007 | Makiura .......................... 427/66 |
| 2007/0110942 A1 * | 5/2007 | Shah et al. .................... 428/40.1 |

FOREIGN PATENT DOCUMENTS

| JP | 05-082404 | 4/1993 |
| JP | 2001-354915 | 12/2001 |
| JP | 2004-002549 | 1/2004 |
| JP | 2004-231808 | 8/2004 |
| JP | 2007-106940 | 4/2007 |

* cited by examiner

*Primary Examiner* — Mark A Osele
*Assistant Examiner* — Nickolas Harm

(57) ABSTRACT

A separating method of a bonded body, the bonded body including two base members and a bonding film through which the base members are boded together, enabling to easily and efficiently separating the bonded body into the two original base members is provided. Further, the bonding film contains a silicone material composed of silicone compounds. The separating method includes: preparing the bonded body with the bonding film; and applying energy for separation to the bonding film so that cleavage is generated within the bonding film due to breakage of a part of molecular bonds of the silicone compounds, to thereby separate the bonded body into the first and second base members.

12 Claims, 8 Drawing Sheets

SEPARATING METHOD OF BONDED BODY

CROSS-REFERENCE TO RELATED APPLICATION

This application claims a priority to Japanese Patent Application No. 2007-307619 filed on Nov. 28, 2007 which is hereby expressly incorporated by reference herein in its entirety.

BACKGROUND

1. Technical Field

The present invention relates to a separating method of a bonded body.

2. Related Art

Conventionally, when two members (base members) are bonded together to obtain a bonded body, a method, in which the two members are bonded together through an adhesive layer formed of an adhesive such as an epoxy-based adhesive or an urethane-based adhesive, has been often used.

However, in the case where the members are bonded together using the adhesive layer, there are problems in that dimensional accuracy of the obtained bonded body is low, and it takes a relatively long time until the adhesive is hardened. For these reasons, as an alternative method of bonding members without using the adhesive, a solid bonding method of directly bonding the members together is proposed. (see, for example, JP-A-5-82404).

These methods are generally used as a method of bonding two members together. However, from a viewpoint of an environmental problem, recently, it is required that the bonded body after being used is recycled.

In order to improve a recycle rate of the bonded body, it is preferred that the bonded body is separated into the two original members, and then they are recycled. However, there is not a method that can efficiently separate the bonded body obtained using the above mentioned methods into the two original members. As a result, there is a problem in that the recycle rate of the bonded body cannot be improved.

SUMMARY

Accordingly, it is an object of the present invention to provide a separating method of a bonded body, wherein the bonded body includes two base members and a bonding film through which the base members are boded together, and the method makes it possible to easily and efficiently separate the bonded body into the two original base members.

An aspect of the present invention is directed to a separating method of a bonded body, wherein the bonded body includes a first base member, a second base member and a bonding film through which the first and second base members are boded together, and the bonding film contains a silicone material composed of silicone compounds.

The separating method comprises: preparing the bonded body with the bonding film; and applying energy for separation to the bonding film so that cleavage is generated within the bonding film due to breakage of a part of molecular bonds of the silicone compounds, to thereby separate the bonded body into the first and second base members.

This makes it possible to easily and efficiently separate the bonded body into the first and second base members.

In the above separating method, it is preferred that the bonded body is obtained through the steps of: applying a liquid material containing the silicone material onto a surface of at least one of the first and second base members, to form a liquid coating on the surface; drying the liquid coating so that it is transformed into the bonding film on the surface of the at least one of the first and second base members; and applying energy for bonding to the bonding film so that a bonding property is developed in the vicinity of a surface thereof, to thereby bond the first and second base members together through the bonding film.

This makes it possible to obtain a bonded body to which the separating method of the present invention can be applied.

In the above separating method, it is preferred that the bonded body is obtained through the steps of: forming the bonding film on a surface of at least one of the first and second base members by polymerizing a raw material thereof using a plasma polymerization method; and applying energy for bonding to the bonding film so that a bonding property is developed in the vicinity of a surface thereof, to thereby bond the first and second base members together through the bonding film.

This also makes it possible to obtain a bonded body to which the separating method of the present invention can be applied.

In the above separating method, it is preferred that in the plasma polymerization method, octamethyltrisiloxane is used as the raw material of the bonding film.

The bonding film containing polymers of the octamethyl trisiloxane as a major component thereof can have a particularly excellent bonding property. Therefore, it is particularly preferably used for bonding the first base member and the second base member together.

Further, since the raw material, in which the octamethyl trisiloxane is contained as a major component thereof, is in the form of liquid having an appropriate viscosity at normal temperature, there is also an advantage that it is easy to use.

In the above separating method, it is preferred that the applying the energy for bonding is performed by at least one method selected from the group comprising a method in which an energy beam is irradiated on the bonding film, a method in which the bonding film is heated and a method in which a compressive force is applied to the bonding film.

This makes it possible to effectively activate a surface of the bonding film. Further, according to the above method, it is possible to prevent excessive breakage of the molecular bonds of the silicone compounds contained in the bonding film. Therefore, in the case where the energy for separation is applied to the bonding film when the bonded body is to be separated, it is possible to reliably generate the cleavage within the bonding film.

In the above separating method, it is preferred that magnitude of the energy for separation is larger than that of the energy for bonding.

By doing so, the bonding property is developed in the vicinity of the surface of the bonding film when applying the energy for bonding thereto, whereas the cleavage is generated within the bonding film when applying the energy for separation thereto.

In the above separating method, it is preferred that each of the silicone compounds has a polydimethylsiloxane chemical structure as a main chemical structure thereof.

Such silicone compounds can be relatively easily available at a low price. Further, such silicone compounds can be preferably used as a major component of the silicone material because methyl groups of the silicone compounds are easily removed from their chemical structures by applying energy to the bonding film containing the silicone compounds, so that the bonding property is reliably developed in the bonding film.

In the above separating method, it is preferred that each of the silicone compounds has at least one silanol group.

In this case, when drying the liquid coating to transform it into the bonding film, hydroxyl groups included in the silanol groups of the adjacent silicone compounds are bonded together. Therefore, the thus formed bonding film can have more excellent film strength.

In the above separating method, it is preferred that the applying the energy for separation is performed by at least one method selected from the group comprising a method in which an energy beam is irradiated on the bonding film and a method in which the bonding film is heated.

This makes it possible to reliably generate the cleavage within the bonding film, while preventing alteration and deterioration of the first base member and the second base member.

In the above separating method, it is preferred that the energy beam is an ultraviolet ray having a wavelength of 126 to 300 nm.

This makes it possible to reliably generate the cleavage within the bonding film, while preventing alteration and deterioration of the first base member and the second base member.

In the above separating method, it is preferred that a temperature of the heating is in the range of 100 to 400° C.

This makes it possible to reliably generate the cleavage within the bonding film, while preventing alteration and deterioration of the first base member and the second base member.

In the above separating method, it is preferred that the applying the energy for separation is performed in an air atmosphere.

Since the air atmosphere contains a sufficient amount of the water molecules, it is possible to reliably generate the cleavage within the bonding film.

In the above separating method, it is preferred that an average thickness of the bonding film is in the range of 10 to 10,000 nm.

By setting the average thickness of the bonding film to the above range, the cleavage can be reliably generated within the bonding film, as a result of which the second base member can be peeled off (removed) from the first base member.

In the above separating method, it is preferred that at least a portion of each of the first and second base members which makes contact with the bonding film is composed of a silicon material, a metal material or a glass material as a major component thereof.

This makes it possible to improve bonding strength of the bonding film to each of the first and second base members, even if each of them is not subjected to a surface treatment.

In the above separating method, it is preferred that a surface of each of the first and second base members which makes contact with the bonding film has been, in advance, subjected to a surface treatment for improving bonding strength between each of the first and second base members and the bonding film.

By doing so, since the surface of each of the first and second base members which makes contact with the bonding film can be cleaned and activated, the bonding film can chemically affect the surface easily. As a result, bonding strength between the bonding film and each of the first and second base members becomes higher.

In the above separating method, it is preferred that the surface treatment is a plasma treatment or an ultraviolet ray irradiation treatment.

Use of the plasma treatment or the ultraviolet ray irradiation treatment makes it possible to particularly optimize the surface of each of the first and second base members so that the bonding film can be reliably formed thereon.

DESCRIPTION OF EXEMPLARY EMBODIMENTS

Hereinafter, a separating method of a bonded body according to the present invention will be described in detail with reference to preferred embodiments shown in the accompanying drawings.

Prior to description of the separating method of the bonded body according to the present invention, description will be made on a bonded body to which the separating method of the bonded body according to the present invention is applied.

Bonded Body

Figure 1:
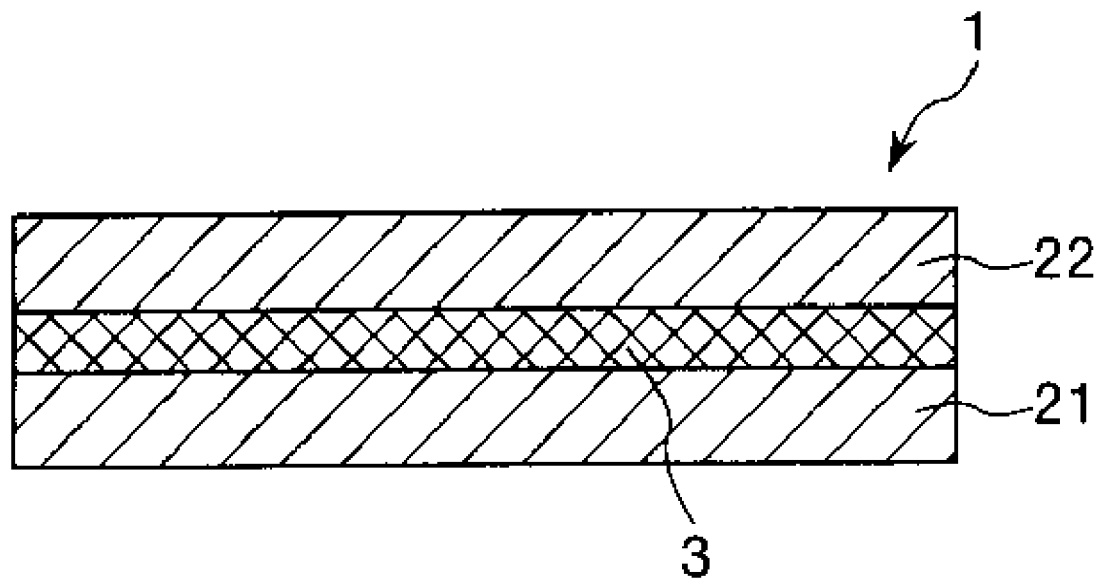
FIG. 1 is a sectional view for explaining a structure of a bonded body to which a separating method of a bonded body according to the present invention is applied.

FIG. 1 is a sectional view for explaining a structure of a bonded body to which the separating method of the bonded body according to the present invention is applied.

The bonded body 1 shown in FIG. 1 includes a first base member 21, a second base member 22, and a bonding film 3 interposed between the first and second base members 21 and 22. In this bonded body 1, the first base member 21 and the second base member 22 are bonded together through the bonding film 3.

A constituent material of each of the first base member 21 and the second base member 22 is not particularly limited to a specific type. Examples of the constituent material of each of them include: a resin-based material such as polyolefin (e.g., polyethylene, polypropylene, ethylene-propylene copolymer, ethylene-acrylate copolymer, ethylene-acrylic acid copolymer, polybutene-1, ethylene-vinyl acetate copolymer (EVA)), cyclic polyolefin, denatured polyolefin, polyvinyl chloride, polyvinylidene chloride, polystyrene, polyamide, polyimide, polyamide-imide, polycarbonate, poly-(4-methylpentene-1), ionomer, acrylic resin, polymethyl methacrylate (PMMA), acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester (e.g., polyethylene terephthalate (PET), polyethylene naphthalate, polybutylene terephthalate (PBT), polycyclohexane terephthalate (PCT)), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, aromatic polyester (e.g., liquid crystal polymer), fluoro resin (e.g., polytetrafluoroethylene, polyfluorovinylidene), thermoplastic elastomer (e.g., styrene-based elastomer, polyolefin-based elastomer, polyvinylchloride-based elastomer, polyurethane-based elastomer, polyester-based elastomer, polyamide-based elastomer, polybutadiene-based elastomer, trans-polyisoprene-based elastomer, fluororubber-based elastomer, chlorinated polyethylene-based elastomer), epoxy resin, phenolic resin, urea resin, melamine resin, aramid resin, unsaturated polyester, silicone resin, polyurethane, or a copolymer, a blended body and a polymer alloy each having at least one of these materials as a major component thereof; a metal-based material such as a metal (e.g., Fe, Ni, Co, Cr, Mn, Zn, Pt, Au, Ag, Cu, Pd, Al, W, Ti, V, Mo, Nb, Zr, Pr, Nd, Sm), an alloy containing at least one of these metals, carbon steel, stainless steel, indium tin oxide (ITO) or gallium arsenide; a silicon-based material such as monocrystalline silicon, polycrystalline silicon or amorphous silicon; a glass-based material such as silicic acid glass (quartz glass), silicic acid alkali glass, soda lime glass, potash lime glass, lead (alkaline) glass, barium glass or borosilicate glass; a ceramic-based material such as alumina, zirconia, $MgAl_2O_4$, ferrite, silicon nitride, aluminum nitride, boron nitride, titanium nitride, carbon silicon, boron carbide, titanium carbide or tungsten carbide; a carbon-based material such as graphite; a complex material containing any one kind of the above materials or two or more kinds of the above materials; and the like.

The constituent materials of the first base member 21 and the second base member 22 may be the same or different from each other. In the case where the constituent materials of the first and second base members 21 and 22 are different from each other, by using the separating method of the bonded body of the present invention described below, it is possible to reliably improve a recycle rate of each of the first and second base members 21 and 22.

The bonding film 3 are interposed between the first base member 21 and the second base member 22, and bonds the first base member 21 and the second base member 22 together therethrough. In the present invention, this bonding film 3 contains a silicone material. In this regard, it is to be noted that a detail structure of the bonding film 3 will be described in the following method of manufacturing the bonded body 1.

Method of Manufacturing Bonded Body

The bonded body 1 having the above structure is manufactured by bonding the first base member 21 and the second base member 22 together through the bonding film 3, using, for example, the following methods (bonding methods) [1] and [2] of manufacturing the bonded body.

Specifically, the method [1] of manufacturing the bonded body 1 comprises the steps of: applying a liquid material containing the silicone material onto at least one of the first base member 21 and the second base member 22 after they are prepared, to form a liquid coating 30; drying the liquid coating 30 so that it is transformed into the bonding film 3, to obtain the bonding film 3 on the at least one of the first and second base members 21 and 22; and applying energy for bonding to the bonding film 3 so that a bonding property is developed in the vicinity of a surface thereof, to thereby bond the first and second base members 21 and 22 together through the bonding film 3. In this way, the bonded body 1 is manufactured.

On the other hand, the method [2] of manufacturing the bonded body 1 comprises the steps of: forming the bonding film 3 on the at least one of the first base member 21 and the second base member 22 using a plasma polymerization method after they are prepared; and applying energy for bonding to the bonding film 3 so that a bonding property is developed in the vicinity of a surface thereof, to thereby bond the first and second base members 21 and 22 together through the bonding film 3. In this way, the bonded body 1 is manufactured.

Hereinafter, in each of the following first and second methods of manufacturing the bonded body 1, the respective steps of the method [1] of manufacturing the bonded body 1 will be specifically described one after another. On the other hand, in each of the following third and fourth methods of manufacturing the bonded body 1, the respective steps of the method [2] of manufacturing the bonded body 1 will be specifically described one after another.

First Method of Manufacturing Bonded Body

FIGS. 2A to 2D and 3E to 3G are sectional views for explaining a first method of manufacturing the bonded body shown in FIG. 1. In this regard, it is to be noted that in the following description, an upper side in each of FIGS. 2A to 2D and 3E to 3G will be referred to as "upper" and a lower side thereof will be referred to as "lower".

In the first method of manufacturing the bonded body 1, the bonded body 1 is manufactured by selectively forming the bonding film 3 on the first base member 21 using the liquid material without forming it on the second base member 22, and then bonding the first base member 21 and the second base member 22 together through the bonding film 3.

[1A] First, the first base member 21 and the second base member 22 each described above are prepared. In this regard, the second base member 22 is not shown in FIG. 2A. Further, a surface of each of the first and second base members 21 and 22 may be subjected to a plating treatment such as a Ni plating treatment, a passivation treatment such as a chromate treatment, a nitriding treatment, or the like.

Although the constituent material of the first base member 21 may be different from or the same as that of the second base member 22, it is preferred that the first base member 21 and the second base member 22 have substantially equal thermal expansion coefficients with each other.

In the case where the first base member 21 and the second base member 22 have the substantially equal thermal expansion coefficients with each other, when the first base member 21 and the second base member 22 are bonded together, stress due to thermal expansion is less easily generated on a bonding interface therebetween. As a result, it is possible to reliably prevent occurrence of peeling in the bonded body 1 finally obtained.

As described in detail below, even if first base member 21 and the second base member 22 have the different thermal expansion coefficients with each other, by optimizing conditions for bonding between the first base member 21 and the second base member 22 in the after step, they can be firmly bond together with high dimensional accuracy.

Furthermore, it is preferred that the two base members 21 and 22 have different rigidities. This makes it possible to more firmly bond the two base members 21 and 22 together.

Moreover, it is preferred that at least one base member of the two base members 21 and 22 is composed of a resin material. The base member composed of the resin material can be easily deformed due to plasticity of the resin material itself.

Therefore, it is possible to reduce stress which would be generated on the bonding interface between the two base members 21 and 22 (e.g., stress due to thermal expansion thereof) when they are bonded together through the bonding film 3. As a result, breaking of the bonding interface becomes hard. This makes it possible to obtain a bonded body 1 having high bonding strength between the two base members 21 and 22.

From the above viewpoint, it is preferred that at least one base member of the two base members 21 and 22 has flexibility. This makes it possible to obtain a bonded body 1 having improved bonding strength between the two base members 21 and 22.

In addition, in the case where the two base members 21 and 22 have flexibility, it is possible to obtain a bonded body 1 having flexibility as a whole thereof. Therefore, such a bonded body 1 can have high functionality.

Further, a shape of each of the base members 21 and 22 may be a plate shape (a film shape), a massive shape (a blocky shape), a stick shape, or the like, as long as it has a shape with a surface which can support the bonding film 3.

In this embodiment, as shown in FIGS. 2A to 2D and 3E to 3G, since each of the base members 21 and 22 has a plate shape, they can easily bend. Therefore, one of the base members 21 and 22 becomes sufficiently bendable (deformable) according to a shape of the other base member when they are laminated together. This makes it possible to improve bonding strength between the base members 21 and 22 in the finally obtained bonded body 1.

In addition, since the base members 21 and 22 can easily bend, stress which would be generated in the bonding interface therebetween can be reduced to some extent. In this case, an average thickness of each of the base members 21 and 22 is not particularly limited to a specific value, but is preferably in the range of about 0.01 to 10 mm, and more preferably in the range of about 0.1 to 3 mm.

[1A-1] Next, a bonding surface 23 of the prepared first base member 21 is subjected to a surface treatment for improving bonding strength between the first base member 21 and the bonding film 3 to be formed, if need.

By doing so, since the bonding surface 23 is cleaned and activated, the bonding film 3 can chemically affect the bonding surface 23 easily. As a result, when the bonding film 3 is formed on the bonding surface 23, it is possible to improve the bonding strength between the bonding film 3 and the bonding surface 23.

Such a surface treatment is not particularly limited to a specific type. Examples of the surface treatment include: a physical surface treatment such as a sputtering treatment or a blast treatment; a chemical surface treatment such as a plasma treatment performed using oxygen plasma and nitrogen plasma, a corona discharge treatment, an etching treatment, an electron beam irradiation treatment, an ultraviolet ray irradiation treatment or an ozone exposure treatment; a treatment performed by combining two or more kinds of these surface treatments; and the like.

In this regard, it is to be noted that in the case where the first base member 21 to be subjected to the surface treatment is formed of a resin material (a polymeric material), the corona discharge treatment, the nitrogen plasma treatment and the like are particularly preferably used.

Especially, by carrying out the plasma treatment or the ultraviolet ray irradiation treatment as the surface treatment, it is possible to more reliably clean and activate the bonding surface 23. As a result, the bonding strength between the bonding surface 23 and the bonding film 3 can be especially improved.

Depending on the constituent material of the first base member 21, the bonding strength of the bonding film 3 to the first base member 21 becomes sufficiently high even if the bonding surface 23 of the first base member 21 is not subjected to the surface treatment described above.

Examples of the constituent material of the first base member 21 with which such an effect is obtained include materials containing various kinds of the metal-based material, various kinds of the silicon-based material, various kinds of the glass-based material and the like as a major component thereof.

The surface of the first base member 21 formed of such materials is covered with an oxide film. In the oxide film, hydroxyl groups exist in a surface thereof. Therefore, by using the first base member 21 covered with such an oxide film, it is possible to improve the bonding strength between the bonding surface 23 of the first base member 21 and the bonding film 3 without subjecting the bonding surface 23 to the surface treatment described above.

Like the first base member 21, a bonding surface 24 (that is, a surface which makes contact with the bonding film 3 in the step described below) of the second base member 22 may have been, in advance, subjected to a surface treatment for improving bonding strength between the bonding surface 24 and the bonding film 3, if need.

By doing so, the bonding surface 24 is cleaned and activated. As a result, when the first base member 21 and the second base member 22 are laminated and bonded together through the bonding film 3, it is possible to improve the bonding strength between the bonding surface 24 and the bonding film 3.

Such a surface treatment is not particularly limited to a specific type, but the same surface treatment as the above mentioned surface treatment, to which the bonding surface 23 of the first base member 21 is subjected, can be used.

Further, like the first base member 21, depending on the constituent material of the second base member 22, the bonding strength between the bonding surface 24 and the bonding film 3 becomes sufficiently high even if the bonding surface 24 is not subjected to the above surface treatment.

Examples of the constituent material of the second base member 22 with which such an effect is obtained include the above mentioned materials containing the various kinds of the metal-based material, the various kinds of the silicon-based material, the various kinds of the glass-based material and the like as the main material thereof.

The surface of the second base member 22 formed of such materials is covered with an oxide film. In the oxide film, hydroxyl groups exist (are exposed) in a surface thereof. Therefore, by using such a second base member 22 covered with the oxide film, it is possible to improve the bonding strength between the bonding surface 24 of the second base member 22 and the bonding film 3 without subjecting the bonding surface 24 to the surface treatment described above.

In this regard, it is to be noted that in this case, the entire of the second base member 22 may not be composed of the above materials, as long as a vicinity of the bonding surface 24 of the second base member 22 at least within a region, to which the bonding film 3 is to be bonded, is composed of the above materials.

Furthermore, if the bonding surface 24 of the second base member 22 has the following groups and substances, the bonding strength between the bonding surface 24 of the second base member 22 and the bonding film 3 can become sufficiently high even if the bonding surface 24 is not subjected to the surface treatment described above.

Examples of such groups and substances include at least one group or substance selected from the group comprising various kinds of functional groups such as a hydroxyl group, a thiol group, a carboxyl group, an amino group, a nitro group and an imidazole group, various kinds of radicals, leaving intermediate molecules such as an open circular molecule and a molecule having at least one unsaturated (double or triple)

bond, halogen such as F, Cl, Br or I, and peroxides, and dangling bonds (or uncoupled bonds) generated by leaving the above groups from atoms to which they had been bonded (that is, dangling bonds present in the atoms not terminated by leaving the above groups therefrom).

Among the leaving intermediate molecules, hydrocarbon molecules each including the open circular molecule or the unsaturated bond are preferably selected. Such hydrocarbon molecules affect the bonding film 3 based on marked reactivity thereof. Therefore, the bonding surface 24 having such hydrocarbon molecules can be particularly firmly bonded to the bonding film 3.

Further, among the functional groups, the hydroxyl group is preferably selected. In the case where the bonding surface 24 has a plurality of the hydroxyl groups, it becomes possible for the bonding surface 24 to firmly bond to the bonding film 3 with ease.

Especially, in the case where the hydroxyl groups are exposed on the surface 32 of the bonding film 3, the bonding surface 24 and the bonding film 3 can be firmly bonded together for a short period of time based on hydrogen bonds which would be generated between the hydroxyl groups of the bonding surface 24 and the hydroxyl groups of the surface 32.

By appropriately performing one selected from various surface treatment described above, the bonding surface 24 having such groups and substances can be obtained. This makes it possible to obtain a second base member 22 that can be firmly bonded to the bonding film 3.

Among them, it is preferred that the hydroxyl groups exist on the bonding surface 24 of the second base member 22. Such a bonding surface 24 and the bonding film 3 exposing the hydroxyl groups strongly attract with each other to form hydrogen bonds between the hydroxyl groups. Finally, this makes it possible to particularly firmly bond the first base member 21 and the second base member 22.

[1A-2] Further, instead of the surface treatment, an intermediate layer may have been, in advance, provided on the bonding surface 23 of the first base member 21. This intermediate layer may have any function.

Such a function is not particularly limited to a specific kind. Examples of the function include: a function of improving bonding strength of the first base member 21 to the bonding film 3; a cushion property (that is, a buffering function); a function of reducing stress concentration; and the like. By forming the bonding film 3 on such an intermediate layer, a bonded body 1 having high reliability can be obtained finally.

A constituent material of the intermediate layer include: a metal-based material such as aluminum or titanium; an oxide-based material such as metal oxide or silicon oxide; a nitride-based material such as metal nitride or silicon nitride; a carbon-based material such as graphite or diamond-like carbon; a self-organization film material such as a silane coupling agent, a thiol-based compound, a metal alkoxide or a metal halide; a resin-based material such as a resin-based adhesive agent, a resin filming material, a resin coating material, various rubbers or various elastomers; and the like, and one or more of which may be used independently or in combination.

Among intermediate layers composed of these various materials, use of the intermediate layer composed of the oxide-based material makes it possible to further improve the bonding strength between the first base member 21 and the bonding film 3 through the intermediate layer.

Further, like the first base member 21, instead of the surface treatment, a surface layer may have been, in advance, provided on the bonding surface 24 of the second base member 22. This surface layer may have any function, like in the case of the first base member 21.

Such a function is not particularly limited to a specific kind. Examples of the function include: a function of improving the bonding strength of the second base member 22 to the bonding film 3; a cushion property (that is, a buffering function); a function of reducing stress concentration; and the like. By bonding the second base member 22 and the bonding film 3 through such a surface layer, a bonded body 1 having high reliability can be obtained finally.

As for a constituent material of such a surface layer, for example, the same material as the constituent material of the intermediate layer formed on the bonding surface 23 of the first base member 21 can be used.

In this regard, it is to be noted that such a surface treatment and formation of the surface layer may be carried out, if necessary. For example, in the case where high bonding strength between the first base member 21 and the second base member 22 is not required, the surface treatment and formation of the surface layer can be omitted.

[2A] Next, the liquid material containing the silicone material is applied onto the bonding surface 23 using an application method. This makes it possible to form the liquid coating 30 on the bonding surface 23 of the first base member 21 (see, FIG. 2B).

The application method is not particularly limited to a specific type. Examples of the application method include a spin coating method, a casting method, a micro-gravure coating method, a gravure coating method, a bar coating method, a roll coating method, a wire-bar coating method, a dip coating method, a spray coating method, a screen printing method, a flexographic printing method, an offset printing method, a micro-contact printing method, a liquid droplet ejecting method and the like.

Among them, it is particularly preferred that the liquid droplet ejecting method is used. According to the liquid droplet ejecting method, the liquid material can be applied onto the bonding surface 23 in the form of liquid droplets 31. Therefore, even in the case where a liquid coating 30 having a predetermined pattern is selectively formed on a partial region of the bonding surface 23, the liquid material can be reliably applied onto the partial region of the bonding surface 23 corresponding to the predetermined pattern of the liquid coating 30.

Although the liquid droplet ejecting method is not particularly limited to a specific type, it is preferable to use an ink jet method by which the liquid material is ejected by utilizing vibration of a piezoelectric element. According to the ink jet method, the liquid material can be applied onto a desired region (position) in the form of the liquid droplets 31 with excellent positional accuracy.

Further, by appropriately setting a frequency of the piezoelectric element, a viscosity of the liquid material and the like to specific ranges, a size of each of the liquid droplets 31 can be controlled relatively easily. Therefore, in the case where the size of each of the liquid droplets 31 is set to a small size, even if a shape of a region where the bonding film 3 is to be formed is fine, the liquid coating 30 can be reliably formed so as to correspond to the fine shape of the region.

The viscosity (at 25° C.) of the liquid material is, generally, preferably in the range of about 0.5 to 200 mPa·s, and more preferably in the range of about 3 to 20 mPa·s. By adjusting the viscosity of the liquid material to the range noted above, the ejection of the liquid droplets 31 can be more stably performed.

Further, the adjustment of the viscosity of the liquid material makes it possible to correctly eject liquid droplets 31 each having a size capable of forming a bonding film 3 having a fine pattern on a region whose shape corresponds to the fine pattern of the bonding film 3.

In addition, such a liquid material can contain a sufficient amount of the silicone material therein. Therefore, by drying the liquid coating 30 formed of such a liquid material in the following step [3A], the bonding film 3 can be formed reliably.

Further, in the case where the viscosity of the liquid material is set to the range noted above, an average amount of the liquid droplets 31 (of the liquid material) can be adjusted, specifically to the range of about 0.1 to 40 pL, and more realistically to the range of about 1 to 30 pL.

This makes it possible for a diameter of each of the liquid droplets 31 landed on the bonding surface 23 to become small. Therefore, it is possible to reliably form a bonding film 3 having a just fine pattern (shape).

Furthermore, by appropriately controlling the number of the liquid droplets 31 (the amount of the liquid material) to be applied onto the bonding surface 23, it is possible to relatively easily adjust a thickness of the bonding film 3 to be formed.

As described above, although the liquid material contains the silicone material, in the case where the silicone material itself is in the form of liquid and has a required viscosity range, the silicone material can be used as the liquid material directly.

On the other hand, in the case where the silicone material itself is in the form of solid or liquid having a high viscosity, a solution or dispersion liquid containing the silicone material can be used as the liquid material.

Examples of a solvent dissolving the silicone material or a dispersion medium for dispersing the same include: various kinds of inorganic solvents such as ammonia, water, hydrogen peroxide, carbon tetrachloride and ethylene carbonate; various kinds of organic solvents such as ketone-based solvents (e.g., methyl ethyl ketone (MEK) and acetone), alcohol-based solvents (e.g., methanol, ethanol and isopropanol), ether-based solvents (e.g., diethyl ether and diisopropyl ether), cellosolve-based solvents (e.g., methyl cellosolve), aliphatic hydrocarbon-based solvents (e.g., hexane and pentane), aromatic hydrocarbon-based solvents (e.g., toluene, xylene and benzene), aromatic heterocycle compound-based solvents (e.g., pyridine, pyrazine and furan), amide-based solvents (e.g., N,N-dimethylformamide), halogen compound-based solvents (dichloroethane and chloroform), ester-based solvents (e.g., ethyl acetate and methyl acetate), sulfur compound-based solvents (e.g., dimethyl sulfoxide (DMSO) and sulfolane), nitrile-based solvents (e.g., acetonitrile, propionitrile and acrylonitrile), organic acid-based solvents (e.g., formic acid and trifluoroacetic acid); mixture solvents each containing at least one kind of the above solvents; and the like.

The silicone material is contained in the liquid material and is a main constituent material of the bonding film 3 which will be formed by drying the liquid material in the following step [3A].

Here, "silicone material" means a material composed of silicone compounds (molecules) each having a polyorganosiloxane chemical structure, that is, silicone compounds each having a main chemical structure (a main chain) mainly constituted of organosiloxane repeating units.

Each of the silicone compounds contained in the silicone material may have a branched chemical structure including a main chain and side chains each branched therefrom, a ringed chemical structure in which the main chain forms a ring shape, or a straight chemical structure in which both ends of the main chain are not bonded together.

In each silicone compound having the polyorganosiloxane chemical structure, for example, an organosiloxane repeating unit constituting each end portion of the polyorganosiloxane chemical structure is a repeating unit represented by the following general formula (1), an organosiloxane repeating unit constituting each connecting portion of the polyorganosiloxane chemical structure is a repeating unit represented by the following general formula (2), and an organosiloxane repeating unit constituting each branched portion of the polyorganosiloxane chemical structure is a repeating unit represented by the following general formula (3).

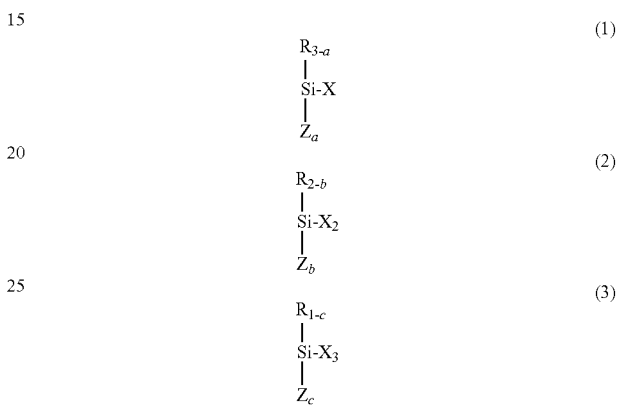

wherein in the general formulas (1) to (3), each of the Rs is independently a substituted hydrocarbon group or an unsubstituted hydrocarbon group, each of the Zs is independently a hydroxyl group or a hydrolysable group, each of the Xs is a siloxane residue, the a is 0 or an integer of 1 to 3, the b is 0 or an integer of 1 to 2, and the c is 0 or 1.

In this regard, the siloxane residue means a substituent group which is bonded to a silicon atom contained in an adjacent repeating unit via an oxygen atom to thereby form a siloxane bond. Specifically, the siloxane residue is a chemical structure of —O—(Si), wherein the Si is the silicon atom contained in the adjacent repeating unit.

In each silicone compound, the polyorganosiloxane chemical structure is preferably the straight chemical structure, that is, a chemical structure constituted of the repeating units each represented by the above general formula (1) and the repeating units each represented by the above general formula (2).

In the case where a silicone material composed of such silicone compounds is used, since in the following step [3A], the silicone compounds are tangled together in the liquid material (the liquid coating 30) so that the bonding film 3 is formed, the thus formed bonding film 3 can have excellent film strength.

Specifically, examples of the silicone compound having such a polyorganosiloxane chemical structure include a silicone compound represented by the following general formula (4).

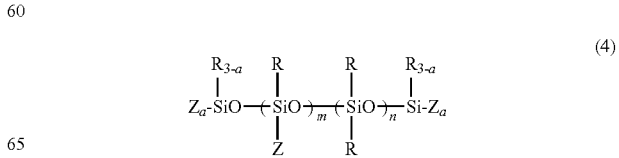

Wherein in the general formula (4), each of the Rs is independently a substituted hydrocarbon group or an unsubstituted hydrocarbon group, each of the Zs is independently a hydroxyl group or a hydrolysable group, the a is 0 or an integer of 1 to 3, the m is 0 or an integer of 1 or more, and the n is 0 or an integer of 1 or more.

In the general formulas (1) to (4), examples of the R (the substituted hydrocarbon group or unsubstituted hydrocarbon group) include: an alkyl group such as a methyl group, an ethyl group or a propyl group; a cycloalkyl group such as a cyclopentyl group or a cyclohexyl group; an aryl group such as a phenyl group, a tolyl group or a biphenylyl group; and an aralkyl group such as a benzyl group or a phenyl ethyl group.

Further, in the above groups, a part of or all hydrogen atoms bonding to carbon atom(s) may be respectively substituted by I) a halogen atom such as a fluorine atom, a chlorine atom or a bromine atom, II) an epoxy group such as a glycidoxy group, III) a (meth)acryloyl group such as an methacryl group, IV) an anionic group such as a carboxyl group or a sulfonyl group, and the like.

Examples of the hydrolysable group include: an alkoxy group such as a methoxy group, an ethoxy group, a propoxy group, a butoxy group; a ketoxime group such as a dimethyl ketoxime group or a methyl ethyl ketoxime group; an acyloxy group such as an acetoxy group; an alkenyloxy group such as an isopropenyloxy group or an isobutenyloxy group; and the like.

Further, in the general formula (4), the m and n represent a degree of polymerization of the polyorganosiloxane chemical structure. The total number of the m and n (that is, m+n) is preferably an integer of about 5 to 10,000, and more preferably an integer of about 50 to 1,000. By setting the degree of the polymerization to the above range, the viscosity of the liquid material can be adjusted to the above mentioned range relatively easily.

Among various kinds of the silicone materials, it is preferable to use a silicone material composed of silicone compounds each having a polydimethylsiloxane chemical structure (that is, a chemical structure represented by the above general formula (4) in which the Rs are the methyl groups) as a main chemical structure thereof. Such silicone compounds can be relatively easily available at a low price.

Further, such silicone compounds can be preferably used as a major component of the silicone material because the methyl groups are easily broken and removed therefrom by applying energy for bonding. Therefore, in the case where the bonding film 3 contains such a silicone material, when applying the energy for bonding to the bonding film 3 in the subsequent step [4A], it is possible for the bonding film 3 to reliably develop the bonding property.

In addition, it is preferred that each of the silicone compounds has at least one silanol group. Specifically, it is preferable to use silicone compounds each having a chemical structure represented by the above general formula (4) in which the Zs are the hydroxyl groups.

In the case where the bonding film 3 is formed using the silicone material composed of such silicone compounds, when drying the liquid coating 30 to transform it into the bonding film 3 in the following step [3A], the hydroxyl groups (included in the silanol groups) of the adjacent silicone compounds are bonded together. Therefore, the thus formed bonding film 3 can have more excellent film strength.

In addition, in the case where the first base member 21 described above, in which the hydroxyl groups are exposed on the bonding surface 23, is used, the hydroxyl groups (included in the silanol groups) of the silicone compounds and the hydroxyl groups present in the first base member 21 are bonded together.

As a result, the silicone compounds can be bonded to the bonding surface 23 not only through physical bonds but also through chemical bonds. This makes it possible for the bonding film 3 to be firmly bonded to the bonding surface 23 of the first base member 21.

Further, the silicone material is a material having relatively high flexibility. Therefore, even if the constituent material of the first base member 21 is different from that of the second base member 22, when the bonded body 1 is obtained by bonding them together through the bonding film 3 in the subsequent step [5A], the bonding film 3 can reliably reduce stress which would be generated between the first and second base members 21 and 22 due to thermal expansions thereof. As a result, it is possible to reliably prevent occurrence of peeling in the bonded body 1 finally obtained.

Since the silicone material also has excellent chemical resistance, it can be effectively used in bonding members, which are exposed to chemicals for a long period of time, together. Specifically, for example, the bonding film 3 of the present invention can be used in manufacturing a liquid droplet ejection head of a commercial ink jet printer in which an organic ink being apt to erode a resin material is employed. This makes it possible to reliably improve durability of the liquid droplet ejection head.

In addition, since the silicone material has excellent heat resistance, it can also be effectively used in bonding members, which are exposed to a high temperature, together.

[3A] Next, the liquid coating 30 provided on the first base member 21 is dried, to thereby obtain a bonding film 3.

A drying temperature of the liquid coating 30 is preferably 25° C. or higher, and more preferably in the range of about 25 to 100° C. Further, a drying time of the liquid coating 30 is preferably in the range of about 0.5 to 48 hours, and more preferably in the range of about 15 to 30 hours.

By drying the liquid coating 30 under the above conditions, it is possible to reliably form a bonding film 3 capable of appropriately developing the bonding property when applying the energy for bonding in the following step [4A].

Further, as described in the step [2A], in the case where the silicone material composed of the silicone compounds each having the at least one silanol group is used, the hydroxyl groups included in the silanol groups of the silicone compounds are reliably bonded together.

In addition, such hydroxyl groups and the hydroxyl groups present in the first base member 21 are reliably bonded together. For these reasons, the thus formed bonding film 3 can have excellent film strength and be firmly bonded to the first base member 21.

An ambient pressure in drying the liquid coating 30 may be an atmospheric pressure, but is preferably a reduced pressure. Specifically, a degree of the reduced pressure is preferably in the range of about $133.3 \times 10^{-5}$ to 1,333 Pa ($1 \times 10^{-5}$ to 10 Torr), and more preferably in the range of about $133.3 \times 10^{-4}$ to 133.3 Pa ($1 \times 10^{-4}$ to 1 Torr).

This makes it possible to improve density of the bonding film 3, that is, the bonding film 3 can become dense. As a result, the bonding film 3 can have more excellent film strength.

In this way, by appropriately controlling the conditions in forming the bonding film 3, it is possible to form a bonding film 3 having a desired film strength and the like.

An average thickness of the bonding film 3 is preferably in the range of about 10 to 10,000 nm, and more preferably in the range of about 50 to 5,000 nm. By setting the average thickness of the formed bonding film 3 to the above range, it is possible to prevent dimensional accuracy of the bonded body 1 obtained by bonding the first base member 21 and the second base member 22 together from being significantly lowered, thereby enabling to firmly bond them together.

In this regard, setting of the average thickness of the bonding film 3 can be performed by appropriately controlling an amount of the liquid material to be applied onto the first base member 21.

In other words, if the average thickness of the bonding film 3 is lower than the above lower limit value, there is a case that the bonded body 1 having sufficient bonding strength between the first base member 21 and the second base member 22 cannot be obtained. In contrast, if the average thickness of the bonding film 3 exceeds the above upper limit value, there is a fear that dimensional accuracy of the bonded body 1 is reduced significantly.

Further, by setting the average thickness of the bonding film 3 to the above range, cleavage can be reliably generated within the bonding film 3, when the bonded body 1 is separated, as a result of which the second base member 22 can be peeled off from the first base member 21.

Moreover, by setting the average thickness of the bonding film 3 to the above range, the bonding film 3 can have a certain degree of elasticity. Therefore, when the first base member 21 and the second base member 22 are bonded together, even if particles or the like adhere (exist) on the bonding surface 24 of the second base member 22 which makes contact with the bonding film 3, the bonding film 3 can be bonded to the bonding surface 24 so as to take in the particles.

As a result, it is possible to reliably suppress or prevent reduction of the bonding strength between the bonding film 3 and the bonding surface 24 and occurrence of peeling of the bonding film 3 from the bonding surface 24 in an interface thereof, due to the existence of the particles.

Further, in this embodiment, the bonding film 3 is formed by applying the liquid material onto the bonding surface 23 of the first base member 21. Therefore, even if irregularities exist on the bonding surface 23, the bonding film 3 can be formed so as to assimilate the irregularities of the bonding surface 23, though it may be affected depending on sizes (heights) thereof. As a result, a surface 32 of the bonding film 3 can be composed from a substantially flat surface.

[4A] Nest, the energy for bonding is applied on the surface 32 of the bonding film 3 formed on the bonding surface 23 of the first base member 21.

When the energy for bonding is applied to the bonding film 3, a part of molecular bonds of the silicone compounds present in the vicinity of the surface 32 of the bonding film 3 are broken. In this regard, for example, if the silicone compounds are the silicone compounds each having the polydimethylsiloxane chemical structure as the main chemical structure thereof, each of the molecular bonds is a Si—$CH_3$ bond.

As a result, the surface 32 is activated due to breakage of the molecular bonds. Namely, the bonding property with respect to the second base member 22 is developed in the vicinity of the surface 32 of the bonding film 3. The first base member 21 having the bonding film 3 in such a state can be firmly bonded to the second base member 22 based on chemical bonds.

Here, in this specification, a state that the surface 32 of the bonding film 3 is "activated" means: a state that a part of the molecular bonds of the silicone compounds present in the vicinity of the surface 32 are broken as described above, e.g., a part of the methyl groups are broken and removed from the polydimethylsiloxane chemical structure, and a part of the silicon atoms are not terminated so that "dangling bonds (or uncoupled bonds)" are generated on the surface 32; a state that the silicon atoms having the dangling bonds (the unpaired electrons) are terminated by hydroxyl groups (OH groups) and the hydroxyl groups exist on the surface 32; and a state that the dangling bonds and the hydroxyl groups coexist on the surface 32.

The energy for bonding may be applied to the bonding film 3 by any method. Examples of the method include: a method in which an energy beam is irradiated on the bonding film 3; a method in which the bonding film 3 is heated; a method in which a compressive force (physical energy) is applied to the bonding film 3; a method in which the bonding film 3 is exposed to plasma (that is, plasma energy is applied to the bonding film 3); a method in which the bonding film 3 is exposed to an ozone gas (that is, chemical energy is applied to the bonding film 3); and the like.

Among these methods, in this embodiment, it is particularly preferred that the method in which the energy beam is irradiated on the bonding film 3 is used as the method in which the energy for bonding is applied to the bonding film 3. Since such a method can efficiently apply the energy for bonding to the bonding film 3 relatively easily, the method is suitably used as the method of applying the energy for bonding. This makes it possible to effectively activate the surface 32 of the bonding film 3.

According to the method in which the energy beam is irradiated on the bonding film 3, it is possible to prevent excessive breakage of the molecular bonds of the silicone compounds contained in the bonding film 3. Therefore, in the case where the energy for separation is applied to the bonding film 3 when the bonded body is separated, it is possible to reliably generate the cleavage within the bonding film 3.

Examples of the energy beam include: a ray such as an ultraviolet ray or a laser beam; an electromagnetic wave such as a X ray or a γ ray; a particle beam such as an electron beam or an ion beam; and combinations of two or more kinds of these energy beams.

Figure 2A:
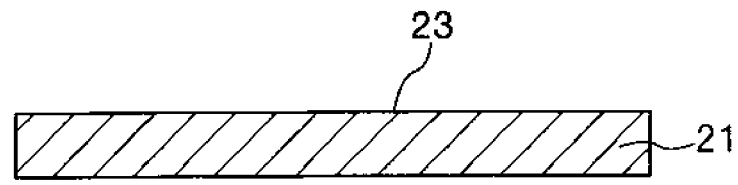
FIGS. 2A to 2D and 3E to 3G are sectional views for explaining a first method of manufacturing the bonded body shown in FIG. 1.
Figure 2B:
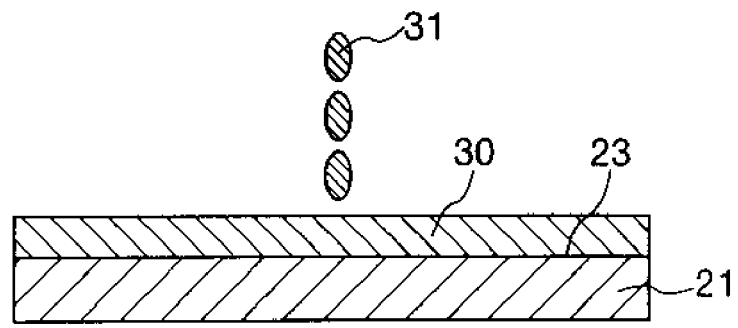
Figure 2C:
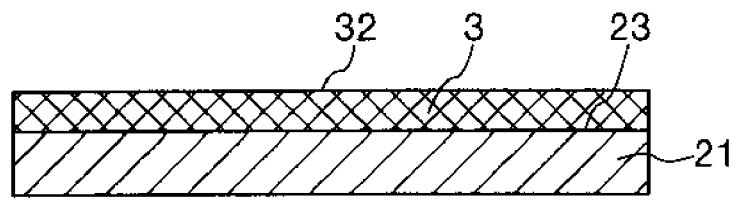
Figure 2D:
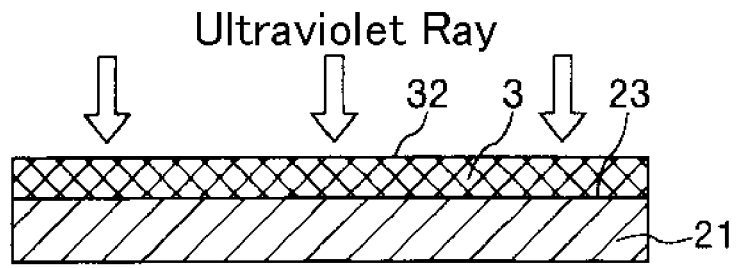

Among these energy beams, it is particularly preferred that an ultraviolet ray having a wavelength of about 126 to 300 nm is used (see FIG. 2D). Use of the ultraviolet ray having such a wavelength makes it possible to optimize an amount of the energy for bonding to be applied to the bonding film 3.

As a result, it is possible to prevent excessive breakage of the molecular bonds of the silicone compounds contained in the bonding film 3 as the major component thereof, and to selectively break the molecular bonds of the silicone compounds present in the vicinity of the surface 32 of the bonding film 3. This makes it possible for the bonding film 3 to develop the bonding property, while preventing a property thereof such as a mechanical property or a chemical property from being lowered.

Further, the use of the ultraviolet ray makes it possible to process a wide area of the surface 32 of the bonding film 3 without unevenness in a short period of time. Therefore, the breakage of the molecular bonds of the silicone compounds composing the silicone material contained in the bonding film 3 can be efficiently performed.

Moreover, such an ultraviolet ray has, for example, an advantage that it can be generated by simple equipment such as an UV lamp. In this regard, it is to be noted that the wavelength of the ultraviolet ray is more preferably in the range of about 126 to 200 nm.

In the case where the UV lamp is used, power of the UV lamp is preferably in the range about of 1 $mW/cm^2$ to 1 $W/cm^2$, and more preferably in the range of about 5 to 50 $mW/cm^2$, although being different depending on an area of the surface 32 of the bonding film 3. In this case, a distance between the UV lamp and the bonding film 3 is preferably in the range of about 3 to 3,000 mm, and more preferably in the range of about 10 to 1,000 mm.

Further, a time for irradiating the ultraviolet ray is preferably set to a time enough for selectively breaking the molecular bonds of the silicone compounds present in the vicinity of the surface 32 of the bonding film 3.

Specifically, the time is preferably in the range of about 1 second to 30 minutes, and more preferably in the range of about 1 second to 10 minutes, although being slightly different depending on an amount of the ultraviolet ray, the constituent material of the bonding film 3, and the like. The ultraviolet ray may be irradiated temporally continuously or intermittently (in a pulse-like manner).

Further, the irradiation of the energy beam on the bonding film 3 may be performed in any ambient atmosphere. Specifically, examples of the ambient atmosphere include: an oxidizing gas atmosphere such as air or an oxygen gas; a reducing gas atmosphere such as a hydrogen gas; an inert gas atmosphere such as a nitrogen gas or an argon gas; a decompressed (vacuum) atmospheres obtained by decompressing any one of these ambient atmospheres; and the like.

Among these ambient atmospheres, the irradiation is particularly preferably performed in the air atmosphere (particularly, an atmosphere having a low dew point). By doing so, it is possible to generate an ozone gas near the surface 32. This makes it possible to more smoothly activate the surface 32. Further, by doing so, it becomes unnecessary to spend a labor hour and a cost for controlling the ambient atmosphere. This makes it possible to easily perform (carry out) the irradiation of the energy beam.

In this way, according to the method of irradiating the energy beam, the energy can be easily applied to the bonding film 3 selectively. Therefore, it is possible to prevent, for example, alteration and deterioration of the first base member 21 due to the application of the energy for bonding.

Further, according to the method of irradiating the energy beam, magnitude of the energy for bonding to be applied can be accurately and easily controlled. Therefore, it is possible to adjust the number of the molecular bonds to be broken within the bonding film 3. By adjusting the number of the molecular bonds to be broken in this way, it is possible to easily control the bonding strength between the first base member 21 and the second base member 22.

In other words, by increasing the number of the molecular bonds to be broken in the vicinity of the surface 32 of the bonding film 3, since a large number of active hands are generated in the vicinity of the surface 32, it is possible to further improve the bonding property developed in the bonding film 3.

On the other hand, by reducing the number of the molecular bonds to be broken in the vicinity of the surface 32 of the bonding film 3, it is possible to reduce the number of the active hands generated in the vicinity of the surface 32, thereby suppressing the bonding property developed in the bonding film 3.

In order to adjust the magnitude of the applied energy for bonding, for example, conditions such as a kind of the energy beam, power of the energy beam, and an irradiation time of the energy beam only have to be controlled.

Further, according to the method of irradiating the energy beam, a large amount of the energy for bonding can be applied to the bonding film 3 for a short period of time. This makes it possible to more effectively perform the application of the energy for bonding.

Figure 3E:
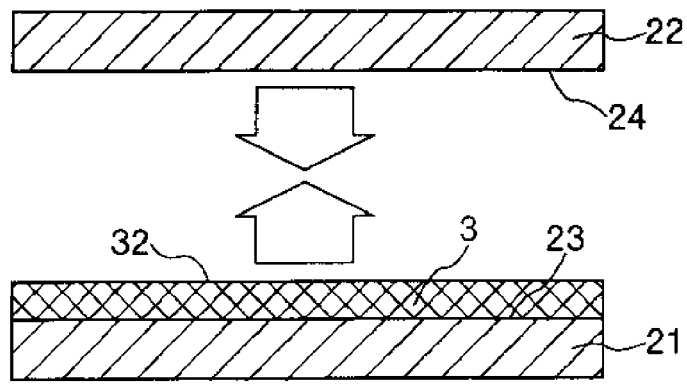

[5A] Next, the first base member 21 and the second base member 22 are laminated together so that the bonding film 3 and the second base member 22 make close contact with each other (see FIG. 3E). At this time, since the surface 32 of the bonding film 3 has developed the bonding property with respect to the second base member 22 in the step [4A], the bonding film 3 and the bonding surface 24 of the second base member 22 are chemically bonded together.

Figure 3F:
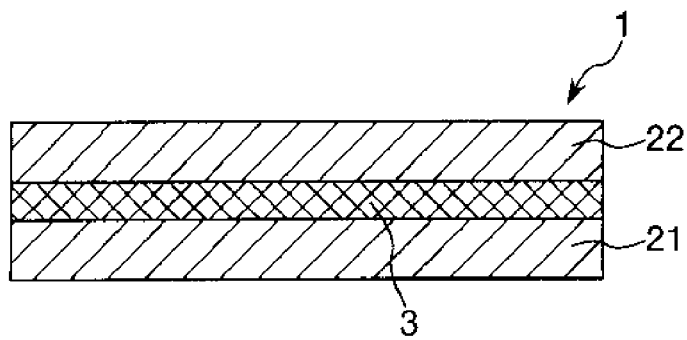

As a result, the first base member 21 and the second base member 22 are bonded together through the bonding film 3, to thereby obtain a bonded body 1 shown in FIG. 3F.

In the bonded body 1 obtained in this way, the two base members 21 and 22 are bonded together by firm chemical bonds formed in a short period of time such as a covalent bond, unlike bond (adhesion) mainly based on a physical bond such as an anchor effect by using the conventional adhesive. Therefore, it is possible to obtain a bonded body 1 in a short period of time, and to prevent occurrence of peeling, bonding unevenness and the like in the bonded body 1.

Further, according to such a bonding method, a heat treatment at a high temperature (e.g., a temperature equal to or higher than 700° C.) is unnecessary unlike the conventional solid bonding method. Therefore, the first base member 21 and the second base member 22 each formed of a material having low heat resistance can also be used for bonding them.

In addition, the first base member 21 and the second base member 22 are bonded together through the bonding film 3. Therefore, there is also an advantage that each of the constituent materials of the base members 21 and 22 is not limited to a specific kind. For these reasons, it is possible to expand selections of the constituent materials of the first base member 21 and the second base member 22.

Further, in the case where the first base member 21 and the second base member 22 have the different thermal expansion coefficients with each other, it is preferred that the first base member 21 and the second base member 22 are bonded together at as low temperature as possible. If they are bonded together at the low temperature, it is possible to further reduce thermal stress which would be generated on the bonding interface therebetween.

Specifically, the first base member 21 and the second base member 22 are bonded together in a state that each of the first base member 21 and the second base member 22 is heated preferably at a temperature of about 25 to 50° C., and more preferably at a temperature of about 25 to 40° C., although being different depending on the difference between the thermal expansion coefficients thereof.

In such a temperature range, even if the difference between the thermal expansion coefficients of the first base member 21 and the second base member 22 is rather large, it is possible to sufficiently reduce thermal stress which would be generated on the bonding interface between the first base member 21 and the second base member 22. As a result, it is possible to reliably suppress or prevent occurrence of warp, peeling or the like in the bonded body 1.

Especially, in the case where the difference between the thermal expansion coefficients of the first base member 21 and the second base member 22 is equal to or larger than $5 \times 10^{-5}$/K, it is particularly recommended that the first base member 21 and the second base member 22 are bonded together at a low temperature as much as possible as described above.

By appropriately setting an area and/or a shape of the bonding film 3 through which the first base member 21 and the second base member 22 are bonded together, it is possible to reduce local concentration of stress which would be generated in the bonding film 3. This makes it possible to reliably bond the first base member 21 and the second base member 22 together, even if the difference between, for example, the thermal expansion coefficients thereof is large.

In this embodiment, as described in the above step [4A] and this step [5A], after the energy for bonding has been applied to the bonding film 3 to develop the bonding property in the vicinity of the surface 32 of the bonding film 3, the first base member 21 and the second base member 22 are laminated and bonded together through the bonding film 3.

However, the bonded body 1 may be obtained by laminating the first base member 21 and the second base member 22 together through the bonding film 3, and then applying the energy for bonding to the bonding film 3. Namely, the bonded body 1 may be obtained by reversing the order of the above step [4A] and this step [5A]. Even if these steps [4A] and [5A] are performed in such an order, the same effects as described above can be obtained.

In this case, the applying the energy for bonding to the bonding film 3 may be performed by a method in which the bonding film 3 is heated or a method in which the compressive force is applied to the bonding film 3, in addition to the above mentioned method in which the energy beam is irradiated on the bonding film 3. In this regard, one or more of which may be used independently or in combination. These methods are preferably used because they are capable of relatively easily and efficiently applying the energy for bonding to the bonding film 3.

In the case where the energy for bonding is applied to the bonding film 3 by heating the bonding film 3, a heating temperature is preferably in the range of about 25 to 100° C., and more preferably in the range of about 50 to 100° C. If the bonding film 3 is heated at a temperature of the above range, it is possible to reliably activate the bonding film 3 while reliably preventing the first base member 21 and the second base member 22 from being thermally altered or deteriorated.

Further, a heating time is set great enough to break the molecular bonds of the silicone compounds present in the vicinity of the surface 32 of the bonding film 3. Specifically, the heating temperature may be preferably in the range of about 1 to 30 minutes if the heating temperature is set to the above mentioned range. Furthermore, the bonding film 3 may be heated by any method. Examples of the heating method include various kinds of methods such as a method of using a heater, a method of irradiating an infrared ray and a method of making contact with a flame.

In the case of using the method of irradiating the infrared ray, it is preferred that the first base member 21 or the second base member 22 is made of a light-absorbing material. This ensures that the first base member 21 or the second base member 22 can generate heat efficiently when the infrared ray is irradiated thereon. As a result, it is possible to efficiently heat the bonding film 3.

Further, in the case of using the method of using the heater or the method of making contact with the flame, it is preferred that, between the first base member 21 and the second base member 22, the base member with which the heater or the flame makes contact is made of a material that exhibits superior thermal conductivity. This makes it possible to efficiently transfer the heat to the bonding film 3 through the first base member 21 or the second base member 22, thereby efficiently heating the bonding film 3.

Furthermore, in the case where the energy for bonding is applied to the bonding film 3 by imparting the compressive force to the bonding film 3, it is preferred that the first base member 21 and the second base member 22 are compressed against each other. Specifically, a pressure in compressing them is preferably in the range of about 0.2 to 10 MPa, and more preferably in the range of about 1 to 5 MPa.

This makes it possible to easily apply appropriate energy for bonding to the bonding film 3 by merely performing a compressing operation, which ensures that a sufficiently high bonding property with respect to the second base member 22 is developed in the bonding film 3. Although the pressure may exceed the above upper limit value, it is likely that damages and the like occur in the first base member 21 and the second base member 22, depending on the constituent materials thereof.

Further, a compressing time is not particularly limited to a specific value, but is preferably in the range of about 10 seconds to 30 minutes. In this regard, it is to be noted that the compressing time can be suitably changed, depending on magnitude of the compressive force. Specifically, the compressing time can be shortened as the compressive force becomes greater.

Here, description will be made on a mechanism that the first base member 21 and the second base member 22 are bonded together in this process. Hereinafter, description will be representatively offered regarding a case that the hydroxyl groups are exposed in the surface 24 of the second base member 22.

In this process, when the first base member 21 and the second base member 22 are laminated together so that the bonding film 3 formed on the first base member 21 makes contact with the bonding surface 24 of the second base member 22, the hydroxyl groups existing on the surface 32 of the bonding film 3 and the hydroxyl groups existing on the bonding surface 24 of the second base member 22 are attracted together, as a result of which hydrogen bonds are generated between the above adjacent hydroxyl groups. It is conceived that the generation of the hydrogen bonds makes it possible to bond the first base member 21 and the second base member 22 together.

Depending on conditions such as a temperature and the like, the hydroxyl groups bonded together through the hydrogen bonds are dehydrated and condensed, so that the hydroxyl groups and/or water molecules are removed from a bonding interface between the bonding film 3 and the second base member 22. As a result, two atoms, to which the hydroxyl group had been bonded, are bonded together directly or via an oxygen atom. In this way, it is conceived that the first base member 21 and the second base member 22 are firmly bonded together.

In addition, in the case where the dangling bonds (the uncoupled bonds) exist on the surface 32 of the bonding film 3 and/or in the bonding film 3 or on the surface 24 of the second base member 22 and/or in the second base member 22, when the first base member 21 and the second base member 22 are laminated together, the dangling bonds are bonded together.

This bonding occurs in a complicated fashion so that the dangling bonds are inter-linked. As a result, network-like bonds are formed in the bonding interface. This makes it possible to particularly firmly bond the bonding film 3 and the second base member 22 together.

In this regard, an activated state that the surface 32 of the bonding film 3 is activated in the step [4A] is reduced with time. Therefore, it is preferred that this step [5A] is started as early as possible after the step [4A]. Specifically, this step [5A] is preferably started within 60 minutes, and more preferably started within 5 minutes after the step [4A].

If the step [5A] is started within such a time, since the surface 32 of the bonding film 3 maintains a sufficient activated state, when the first base member 21 is bonded to the second base member 22 through the bonding film 3, they can be bonded together with sufficient high bonding strength therebetween.

In other words, the bonding film 3 before being activated is a film containing the silicone material as the major component thereof, and therefore it has relatively high chemical stability and excellent weather resistance. For this reason, the bonding film 3 before being activated can be stably stored for a long period of time. Therefore, a first base member 21 having such a bonding film 3 may be used as follows.

Namely, first, a large number of the first base members 21 each having such a bonding film 3 have been manufactured or purchased, and stored in advance. Then just before each of the first base member 21 is laminated to the second base member 22 through the bonding film 3 in this step, the energy for bonding is applied to only a necessary number of the first base members 21 each having such a bonding film 3 as described in the step [4A]. This use is preferable because the bonded bodies 1 are manufactured effectively.

In the manner described above, it is possible to obtain a bonded body 1 shown in FIG. 3F.

In the bonded body 1 obtained in this way, the bonding strength between the first base member 21 and the second base member 22 is preferably equal to or larger than 5 MPa (50 kgf/cm$^2$), and more preferably equal to or larger than 10 MPa (100 kgf/cm$^2$). Therefore, peeling of the bonded body 1 having such bonding strength therebetween can be sufficiently prevented.

Further, use of such a bonding method makes it possible to efficiently manufacture the bonded body 1 in which the first base member 21 and the second base member 22 are bonded together by the above large bonding strength therebetween.

Just when the bonded body 1 is obtained or after the bonded body 1 has been obtained, if necessary, at least one step (step of improving bonding strength between the first base member 21 and the second base member 22) among three steps (steps [6a], [6b] and [6c]) described below may be applied to the bonded body 1. This makes it possible to further improve the bonding strength between the first base member 21 and the second base member 22 with ease.

Figure 3G:
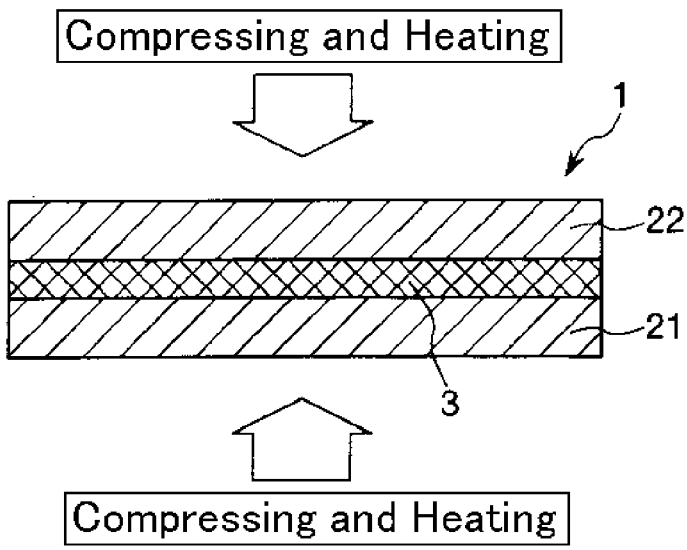

[6a] In this step, as shown in FIG. 3G, the obtained bonded body 1 is compressed in a direction in which the first base member 21 and the second base member 22 come close to each other.

As a result, surfaces of the bonding film 3 come closer to the bonding surface 23 of the first base member 21 and the bonding surface 24 of the second base member 22. It is possible to further improve the bonding strength between the members in the bonded body 1 (e.g., between the first base member 21 and the bonding film 3 and between the bonding film 3 and the second base member 22).

Further, by compressing the bonded body 1, spaces remaining in each of the boding interfaces (the contact interfaces) in the bonded body 1 can be crashed to further increase a bonding area (a contact area) thereof. This makes it possible to further improve the bonding strength between the members in the bonded body 1.

In this regard, it is to be noted that a pressure in compressing the bonded body 1 can be appropriately adjusted, depending on the constituent materials and thicknesses of the first base member 21 and the second base member 22, conditions of a bonding apparatus, and the like.

Specifically, the pressure is preferably in the range of about 0.2 to 10 MPa, and more preferably in the range of about 1 to 5 MPa, although being slightly different depending on the constituent materials and thicknesses of the first base member 21 and the second base member 22, and the like.

By setting the pressure to the above range, it is possible to reliably improve the bonding strength between the members in the bonded body 5. Further, although the pressure may exceed the above upper limit value, there is a fear that damages and the like occur in the first base member 21 and the second base member 22, depending on the constituent materials thereof.

A time for compressing the bonded body 1 is not particularly limited to a specific value, but is preferably in the range of about 10 seconds to 30 minutes. The compressing time can be appropriately changed, depending on the pressure in compressing the bonded body 1. Specifically, in the case where the pressure in compressing the bonded body 1 is higher, it is possible to improve the bonding strength between the members in the bonded body 5 even if the compressing time becomes short.

[6b] In this step, as shown in FIG. 3G, the obtained bonded body 1 is heated.

This makes it possible to further improve the bonding strength between the members in the bonded body 1. A temperature in heating the bonded body 1 is not particularly limited to a specific value, as long as the temperature is higher than room temperature and lower than a heat resistant temperature of the bonded body 1.

Specifically, the temperature is preferably in the range of about 25 to 100° C., and more preferably in the range of about 50 to 100° C. If the bonded body 1 is heated at the temperature of the above range, it is possible to reliably improve the bonding strength between the members in the bonded body 1 while reliably preventing them from being thermally altered and deteriorated.

Further, a heating time is not particularly limited to a specific value, but is preferably in the range of about 1 to 30 minutes.

In the case where both steps [6a] and [6b] are performed, the steps are preferably performed simultaneously. In other words, as shown in FIG. 3G, the bonded body 1 is preferably heated while being compressed. By doing so, an effect by compressing and an effect by heating are exhibited synergistically. It is possible to particularly improve the bonding strength between the members in the bonded body 1.

[6c] In this step, an ultraviolet ray is irradiated on the obtained bonded body 1.

This makes it possible to increase the number of chemical bonds formed between the bonding film 3 and the second base member 22 in the bonded body 1. As a result, it is possible to particularly improve the bonding strength therebetween. Conditions of the ultraviolet ray irradiated at this time can be the same as those of the ultraviolet ray irradiated in the step [4A] described above.

Further, in the case where this step [6c] is performed, one of the first base member 21 and the second base member 22 needs to have translucency. It is possible to reliably irradiate the ultraviolet ray on the bonding film 3 by irradiating it from the side of the base member having the translucency.

Through the steps described above, it is possible to easily improve the bonding strength between the members in the bonded body 1 (especially, between the bonding film 3 and the second base member 22), and, eventually, to further improve the bonding strength between the first base member 21 and the second base member 22.

In the first method of manufacturing the bonded body 1, description is made on a case that the ink jet method is used as the liquid droplet ejecting method. The liquid droplet ejecting method is not limited thereto. A bubble jet method (the term "bubble jet" is a registered trademark), in which an ink is ejected using a thermal expansion of a material caused by thermoelectric conversion elements, may be used as the liquid droplet ejecting method. According to the bubble jet method, the same effects as described above can be obtained.

Second Method of Manufacturing Bonded Body

Next, description will be made on a second method of manufacturing the bonded body 1.

Figure 4A:
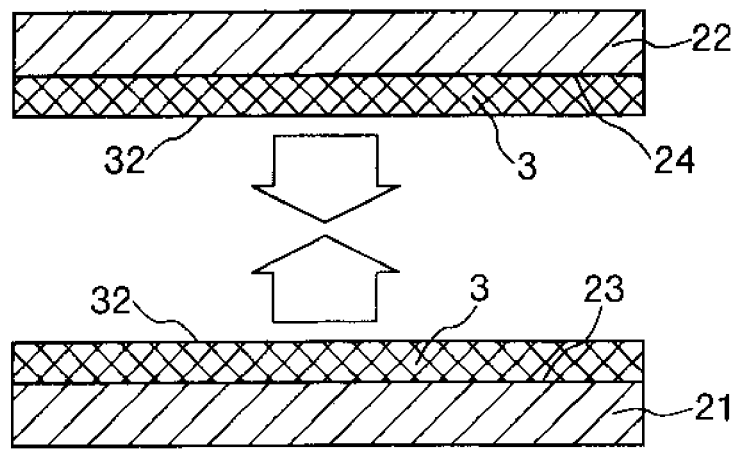
FIGS. 4A to 4C are sectional views for explaining a second method of manufacturing the bonded body shown in FIG. 1.
Figure 4B:
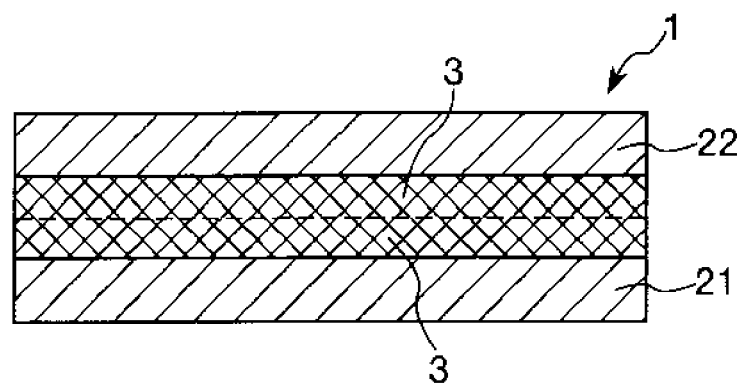
Figure 4C:
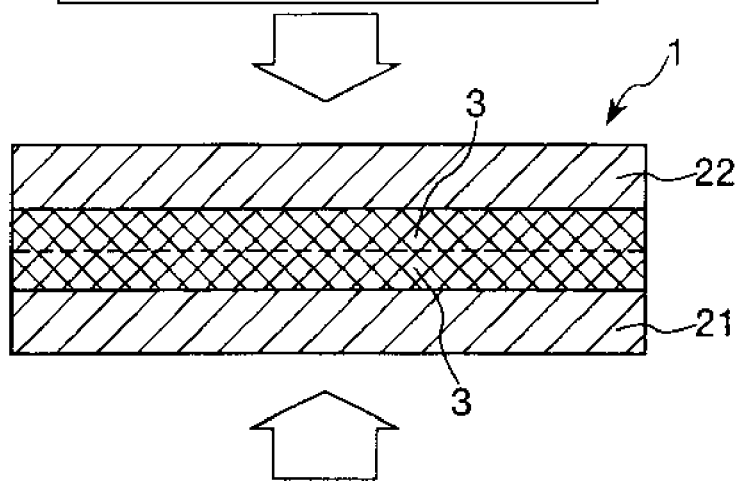

FIGS. 4A to 4C are sectional views for explaining the second method of manufacturing the bonded body shown in FIG. 1. In this regard, it is to be noted that in the following description, an upper side in each of FIGS. 4A to 4C will be referred to as "upper" and a lower side thereof will be referred to as "lower".

Hereinafter, the second method of manufacturing the bonded body 1 will be described by placing emphasis on the points differing from the first method of manufacturing the bonded body 1, with the same matters omitted from description.

The second method of manufacturing the bonded body 1 is the same as that of the first method of manufacturing the bonded body 1, except that the bonding film 3 is also formed on the bonding surface 24 of the second base member 22.

Specifically, in the second method, the bonding film 3 is formed on the bonding surface 23 of the first base member 21 using the liquid material, the bonding film 3 is also formed on the bonding surface 24 of the second base member 22 using the liquid material, the bonding property is developed in the vicinity of the surface 32 of each of the bonding films 3 formed on the base members 21 and 22, and then the bonding films 3 make contact with each other so that the first base member 21 and the second base member 22 are bonded together through the bonding films 3, to thereby obtain a bonded body 1.

In other words, the second method is a method in which the bonding films 3 are formed on both the first base member 21 and the second base member 22 using the liquid material, and then the first base member 21 and the second base member 22 are bonded together by unifying the bonding films 3.

[1B] First, prepared are the same first base member 21 and second base member 22 as described in the step [1A].

[2B] Next, the bonding film 3 is formed on the bonding surface 23 of the first base member 21 and the bonding film 3 is also formed on the bonding surface 24 of the second base member 22 in the same manner as in the steps [2A] and [3A] described above.

[3B] Next, the energy for bonding is applied to both the bonding film 3 formed on the first base member 21 and the bonding film 3 formed on the second base member 22 in the same manner as in the step [4A] described above. In this way, the bonding property is developed in the vicinity of the surface 32 of each of the bonding films 3.

[4B] Then, as shown in FIG. 4A, the base members 21 and 22 are laminated together so that the bonding films 3 each having the bonding property thus developed make close contact with each other. In this step, the base members 21 and 22 are bonded together through the bonding films 3 formed on both of the base members 21 and 22, to thereby obtain the bonded body 1 shown in FIG. 4B.

In this regard, it is to be noted that conditions in bonding the base members 21 and 22 together are set to the same as in the step [5A] described above. In this way, the bonded body 1 can be obtained.

If necessary, the bonded body 1 thus obtained may be subjected to at least one of the steps [6a], [6b] and [6c] each described in the first method.

For example, if the bonded body 1 is heated while compressing the same, the base members 21 and 22 of the bonded body 1 come closer to each other. This accelerates the dehydration and condensation of the hydroxyl groups and/or the bonding of the dangling bonds in, specially, a bonding interface between the bonding films 3. Thus, unification (bonding) of the bonding films 3 is further progressed, whereby they are substantially completely united finally.

Third Method of Manufacturing Bonded Body

Next, description will be made on a third method of manufacturing the bonded body 1.

Hereinafter, the third method of manufacturing the bonded body 1 will be described by placing emphasis on the points differing from the first method of manufacturing the bonded body 1, with the same matters omitted from description.

The third method of manufacturing the bonded body 1 is the same as the first method of manufacturing the bonded body 1, except that the bonding film 3 is formed on the bonding surface 23 of the first base member 21 using a plasma polymerization method.

Specifically, in the third method, the bonding film 3 is selectively formed on the bonding surface 23 of the first base member 21 using the plasma polymerization method without being formed on the bonding surface 24 of the second base member 22, and then the first base member 21 and the second base member 22 are bonded together through the bonding film 3, to thereby obtain a bonded body 1.

[1C] First, prepared are the same first base member 21 and second base member 22 as described in the step [1A].

[2C] Next, the bonding film 3 is formed on the bonding surface 23 of the first base member 21 using the plasma polymerization method.

Such a bonding film 3 can be obtained by placing the first base member 21 in intense electric field, and then supplying a mixture gas of a raw gas and a carrier gas in the intense electric field, to thereby polymerize molecules constituting the raw gas (a raw material in the form of gas) on the first base member 21. Specifically, the bonding film 3 can be formed as follows.

[2C-1] First, the first base member 21 is placed in a chamber included in a plasma polymerization apparatus, the chamber is sealed, and then pressure inside the chamber is reduced.

Next, the mixture gas of the raw gas and the carrier gas is supplied into the chamber by activating a gas supply part included in the plasma polymerization apparatus, thereby the chamber is filled with the supplied mixture gas.

A ratio (a mix ratio) of the raw gas in the mixture gas is preferably set in the range of about 20 to 70%, and more preferably in the range of about 30 to 60%, though the ratio is slightly different depending on a kind of the raw gas or the carrier gas and an intended deposition speed. This makes it possible to optimize conditions for forming (depositing) the bonding film 3.

A flow rate of the supplying mixture gas is appropriately decided depending on a kind of the raw gas or the carrier gas, an intended deposition speed, a thickness of the bonding film 3 to be formed or the like. The flow rate is not particularly limited to a specific value, but normally is preferably set in the range of about 1 to 100 ccm, and more preferably in the range of about 10 to 60 ccm.

[2C-3] Next, a high-frequency voltage is applied between a pair of electrodes provided in the chamber. In this way, the molecules constituting the raw gas which exists between the electrodes are allowed to ionize, thereby generating plasma.

At this time, the molecules constituting the raw gas are polymerized by plasma energy to produce polymers, thereafter the produced polymers are allowed to adhere and are deposited on the first base member 21.

Examples of the raw gas include organosiloxanes such as methyl siloxane, octamethyl trisiloxane, decamethyl tetrasilixane, decamethyl cyclopentasiloxane, octamethyl cyclotetrasiloxane, and methylphenyl siloxane and the like.

The bonding film 3 obtained using such a raw gas is a film formed by polymerizing the molecules constituting the raw gas, that is, a film formed of the silicone material composed of the silicone compounds each having the polyorganosiloxane chemical structure.

Among the organosiloxanes, it is particularly preferred that the octamethyl trisiloxane is used. A bonding film 3 containing polymers of the octamethyl trisiloxane as a major component thereof can have a particularly excellent bonding property. Therefore, it is particularly preferably used for bonding the first base member 21 and the second base member 22.

Further, since the raw material, in which the octamethyl trisiloxane is contained as a major component thereof, is in the form of liquid having an appropriate viscosity at normal temperature, there is also an advantage that it is easy to use.

A frequency of the high-frequency voltage applied between the electrodes is not particularly limited to a specific value, but is preferably in the range of about 1 kHz to 100 MHz, and more preferably in the range of about 10 to 60 MHz.

An output density of the high-frequency voltage is not particularly limited to a specific value, but is preferably in the range of about 0.01 to 10 W/cm$^2$, and more preferably in the range of about 0.1 to 1 W/cm$^2$.

An inside pressure of the chamber during the formation of the bonding film 3 is preferably in the range of about $133.3 \times 10^{-5}$ to 1333 Pa ($1 \times 10^{-5}$ to 10 Torr), and more preferably in the range of about $133.3 \times 10^{-4}$ to 133.3 Pa ($1 \times 10^{-4}$ to 1 Torr).

A flow rate of the raw gas is preferably in the range of about 0.5 to 200 sccm, and more preferably in the range of about 1 to 100 sccm. On the other hand, a flow rate of the carrier gas is preferably in the range of about 5 to 750 sccm, and more preferably in the range of about 10 to 500 sccm.

A time required for the deposition is preferably in the range of about 1 to 10 minuets, and more preferably in the range of about 4 to 7 minuets. A temperature of the first base member 21 is preferably 25° C. or higher, and more preferably in the range of about 25 to 100° C.

By setting such conditions in forming the bonding film 3 to the above ranges, it is possible to evenly form a dense bonding film 3.

[3C] Next, the energy for bonding is applied to the bonding film 3 formed on the first base member 21 in the same manner as in the step [4A] described above. In this way, the bonding property is developed in the vicinity of the surface 32 of the bonding films 3.

[4C] Then, the first base member 21 and the second base member 22 are laminated together in the same manner as in the step [5A] described above. In this step, the first base members 21 and the second base member 22 are bonded together through the bonding film 3, to thereby obtain a bonded body 1.

In this way, the bonded body 1 can be obtained. If necessary, the bonded body 1 thus obtained may be subjected to at least one of the steps [6a], [6b] and [6c] each described in the first method.

Fourth Method of Manufacturing Bonded Body

Next, description will be made on a fourth method of manufacturing the bonded body 1.

Hereinafter, the fourth method of manufacturing the bonded body 1 will be described by placing emphasis on the points differing from the first to third methods of manufacturing the bonded body 1, with the same matters omitted from description.

In the fourth method of manufacturing the bonded body 1, combination of the first to third methods of manufacturing the bonded body 1 is used.

Specifically, in the fourth method, the bonding film 3 is formed on the bonding surface 23 of the first base member 21 using the plasma polymerization method, the bonding film 3 is also formed on the bonding surface 24 of the second base member 22 using the plasma polymerization method, the bonding property is developed in the vicinity of the surface 32 of each of the bonding films 3 formed on the base members 21 and 22, and then the bonding films 3 make contact with each other so that the first base member 21 and the second base member 22 are bonded together through the bonding films 3, to thereby obtain a bonded body 1.

In other wards, the fourth method is a method in which the bonding films 3 are formed on both the first base member 21 and the second base member 22 using the plasma polymerization method, and then the first base member 21 and the second base member 22 are bonded together by unifying the bonding films 3.

[1D] First, prepared are the same first base member 21 and second base member 22 as described in the step [1A].

[2D] Next, the bonding film 3 is formed on the bonding surface 23 of the first base member 21 and the bonding film 3 is also formed on the bonding surface 24 of the second base member 22 using the plasma polymerization method in the same manner as in the step [2C] described above.

[3D] Next, the energy for bonding is applied to both the bonding film 3 formed on the first base member 21 and the bonding film 3 formed on the second base member 22 in the same manner as in the step [3B] described above. In this way, the bonding property is developed in the vicinity of the surface 32 of each of the bonding films 3.

[4D] Then, the base members 21 and 22 are laminated together so that the bonding films 3 each having the bonding property thus developed make close contact with each other in the same manner as in the step [4B] described above, to thereby obtain the bonded body 1

In this way, the bonded body 1 can be obtained. If necessary, the bonded body 1 thus obtained may be subjected to at least one of the steps [6a], [6b] and [6c] each described in the first method.

Separating Method of Bonded Body

Next, description will be made on the separating method of the bonded body according to the present invention.

Figure 5A:
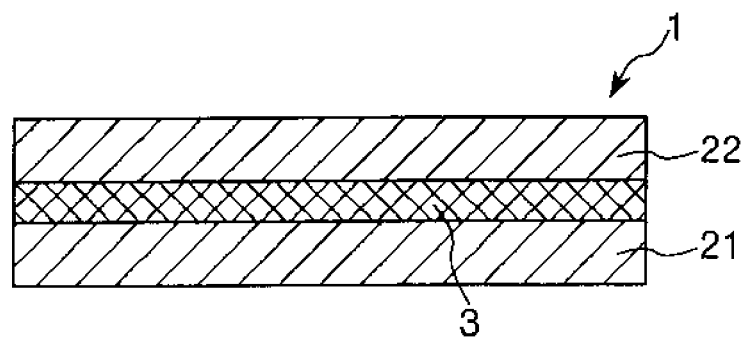
FIGS. 5A to 5C are sectional views for explaining the steps of separating the bonded body shown in FIG. 1 using the separating method of the bonded body according to the present invention.
Figure 5B:
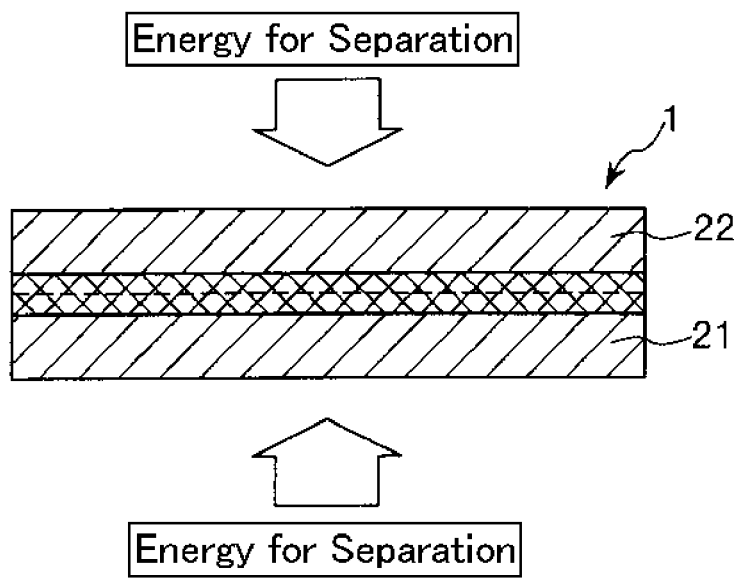
Figure 5C:
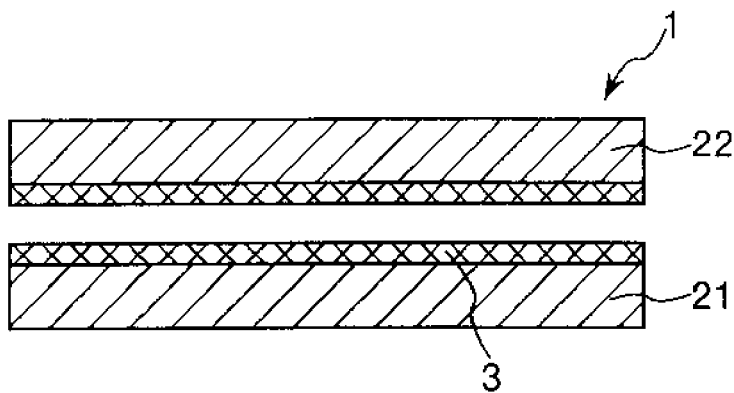

FIGS. 5A to 5C are sectional views for explaining the steps of separating the bonded body shown in FIG. 1 using the separating method of the bonded body according to the present invention.

In this regard, it is to be noted that in the following description, an upper side in each of FIGS. 5A to 5C will be referred to as "upper" and a lower side thereof will be referred to as "lower".

[1] First, the bonded body 1 described above is prepared as a bonded body to which the separating method of the bonded body according to the present invention is applied. In the bonded body 1, the first base member 21 and the second base member 22 are boded together through the bonding film 3 containing the silicone material (see FIG. 5A).

In the case where in the following step [2], a method of irradiating an energy beam (e.g., an ultraviolet ray) on the bonding film 3 is used as a method of applying energy for separation to the bonding film 3, a base member having translucency of the energy beam (e.g., the ultraviolet ray) is used as at least one of the first base member 21 and the second base member 22, that is, at least a base member which is provided on the irradiation side of the energy beam.

Examples of a constituent material of the base member having translucency of the energy beam include: a resin material such as polyolefin (e.g., polyethylene, polypropylene, ethylene-propylene copolymer, ethylene-acrylate copolymer, ethylene-acrylic acid copolymer, ionomer, polybutene-1, ethylene-vinyl acetate-based copolymer (EVA)), polyester, polycarbonate or PMMA; a ceramics-based material having translucency of the ultraviolet ray such as $MgAl_2O_4$.

[2] Next, the energy for separation is applied to the bonding film 3 of the bonded body 1 (see FIG. 5B). This makes it possible to break a part of molecular bonds of the silicone compounds constituting the silicone material. As a result, cleavage is generated within the bonding film 3, whereby the second base member 22 can be peeled off (removed) from the first base member 21.

Here, it is conceived that the generation of the cleavage within the bonding film 3 due to the application of the energy for separation results from the following mechanism. In the case where the silicone material contained in the bonding film 3 is constituted of the silicone compounds each having the polydimethylsiloxane chemical structure as the main chemical structure thereof, when the energy for separation is applied to the bonding film 3, Si—$CH_3$ bonds of the polydimethylsiloxane chemical structures are broken and reacted with water molecules or the like contained in an ambient atmosphere, to thereby generate, for example, methane.

This methane exists in the form of gas (as a methane gas) within the bonding film 3 of the bonded body 1. The gas occupies large volume within the bonding film 3. In portions where the gas is generated, the bonding film 3 is expanded. As a result, Si—O bonds of the polydimethylsiloxane chemical structures are also broken in these portions. Finally, the cleavage is generated within the bonding film 3.

The application of the energy for separation to the bonding film 3 may be performed in any ambient atmosphere, as long as the atmosphere contains the water molecules, but it is preferably performed in an air atmosphere. In this case, since the air atmosphere contains a sufficient amount of the water molecules, it is possible to reliably generate the cleavage within the bonding film 3 without using a special apparatus.

In this way, in order to generate the cleavage within the bonding film 3, it is needed that the bonding film 3 is not formed of $SiO_x$ which is an inorganic matter, but is formed of a material composed of compounds in which the inorganic matter and an organic matter are chemically bonded together, that is, the silicone material. Therefore, in the bonding film 3, an abundance ratio of the silicon atoms to the carbon atoms is preferably in the range of about 2:8 to 8:2, and more preferably in the range of about 3:7 to 7:3.

By setting the abundance ratio of the silicon atoms to the carbon atoms to the above range, the bonding film 3 can exhibit the excellent function thereof, and become a film capable of generating the cleavage within the bonding film 3 due to the application of the energy for separation.

Further, it is preferred that magnitude of the energy for separation is larger than that of the energy for bonding. This makes it possible to selectively break the Si—$CH_3$ bonds present in the vicinity of the surface of the bonding film 3 when applying the energy for bonding thereto, and to selectively break the Si—$CH_3$ bonds present within the bonding film 3 when applying the energy for separation thereto.

As a result, the bonding property is developed in the vicinity of the surface of the bonding film 3 when applying the energy for bonding thereto, whereas the cleavage is generated within the bonding film 3 when applying the energy for separation thereto.

Like the energy for bonding described above, the energy for separation may be applied to the bonding film 3 by any method. Examples of the method include: a method in which an energy beam is irradiated on the bonding film 3; a method in which the bonding film 3 is heated; a method in which a compressive force (physical energy) is applied to the bonding film 3; a method in which the bonding film 3 is exposed to plasma (that is, plasma energy is applied to the bonding film 3); a method in which the bonding film 3 is exposed to an ozone gas (that is, chemical energy is applied to the bonding film 3); and the like.

Among these methods, in this embodiment, it is particularly preferred that at least one of the method in which the energy beam is irradiated on the bonding film 3 and the method in which the bonding film 3 is heated is used as the method for applying the energy for separation to the bonding film 3. Since such a method can selectively apply the energy for separation to the bonding film 3 relatively easily. This makes it possible to more reliably generate the cleavage within the bonding film 3.

Examples of the energy beam include the same energy beam as described in the energy for bonding. Among these energy beams, it is particularly preferred to use the ray such as the ultraviolet ray or the laser beam. Use of the ray makes it possible to reliably generate the cleavage within the bonding film 3 while preventing alteration and deterioration of the first base member 21 and the second base member 22.

In this regard, a wavelength of the ultraviolet ray is preferably in the range of about 126 to 300 nm, and more preferably in the range of about 126 to 200 nm.

Further, in the case where an UV lamp is used, power of the UV lamp is preferably in the range about of 1 mW/cm$^2$ to 1 W/cm$^2$, and more preferably in the range of about 5 to 50 mW/cm$^2$, although being different depending on an area of the surface 32 of the bonding film 3. In this case, a distance between the UV lamp and the bonding film 3 is preferably in the range of about 3 to 3,000 mm, and more preferably in the range of about 10 to 1,000 mm.

Further, a time for irradiating the ultraviolet ray is set to a time required for generation of the cleavage within the bonding film 3. Specifically, the time is preferably in the range of about 10 to 180 minutes, and more preferably in the range of about 30 to 60 minutes, although being slightly different depending on an amount of the ultraviolet ray, the constituent material of the bonding film 3, and the like. The ultraviolet ray may be irradiated temporally, continuously or intermittently (in a pulse-like manner).

On the other hand, examples of the laser beam include: a pulse oscillation laser (a pulse laser) such as an excimer laser; a continuous oscillation laser such as a carbon dioxide laser or a semiconductor laser; and the like. Among these lasers, it is preferred that the pulse laser is used.

Use of the pulse laser makes it difficult to accumulate of heat in a portion of the bonding film 3 where the laser beam is irradiated with time. Therefore, it is possible to reliably prevent alteration and deterioration of the first base member 21 and the second base member 22 due to the heat accumulated.

In the case where influence of the heat is taken into account, it is preferred that a pulse width of the pulse laser is as small as possible. Specifically, the pulse width is preferably equal to or smaller than 1 ps (picosecond), and more preferably equal to or smaller than 500 fs (femtoseconds). By setting the pulse width to the above range, it is possible to reliably suppress the influence of the heat generated in the bonding film 3 due to the irradiation with the laser beam.

Further, by setting the pulse width to the above range, it is possible to prevent accumulate of the heat in the portion of the bonding film 3 where the laser beam is irradiated, and expanse of the portion having a high temperature in a thickness direction of the bonding film 3 (that is, the irradiating direction of the laser beam).

For these reasons, it is possible to adjust a position (a cleavage position) which the cleavage would be generated within the bonding film 3 with high accuracy. In this regard, it is to be noted that the pulse laser having the small pulse width of the above range is called "femtosecond laser".

A wavelength of the laser beam is not particularly limited to a specific value, but is preferably in the range of about 200 to 1200 nm, and more preferably in the range of about 400 to 1,000 nm. Further, in the case of the pulse laser, peak power of the laser beam is preferably in the range of about 0.1 to 10 W, and more preferably in the range of about 1 to 5 W, although being different depending on the pulse width thereof.

Moreover, a repetitive frequency of the pulse laser is preferably in the range of about 0.1 to 100 kHz, and more preferably in the range of about 1 to 10 kHz. By setting the frequency of the pulse laser to the above range, the Si—$CH_3$ bonds can be selectively broken.

Further, the irradiation of the energy beam, which is used for generating the cleavage within the bonding film 3, to the bonding film 3 may be performed in any ambient atmosphere. Specifically, examples of the ambient atmosphere include: an oxidizing gas atmosphere such as air or an oxygen gas; a reducing gas atmosphere such as a hydrogen gas; an inert gas atmosphere such as a nitrogen gas or an argon gas; a decompressed (vacuum) atmosphere obtained by decompressing any one of these ambient atmospheres; and the like.

Among these ambient atmospheres, it is particularly preferred that the irradiation is performed in the inert gas atmosphere (particularly, the nitrogen gas atmosphere). This makes it possible to effectively apply the energy within the bonding film 3, thereby generating the cleavage within the bonding film 3 more reliably.

In the case where the bonding film 3 is heated, a heating temperature of the bonded body 1 is preferably in the range of about 100 to 400° C., and more preferably in the range of about 150 to 300° C. By heating the bonded body 1 in such a heating temperature range, it is possible to reliably generate the cleavage within the bonding film 3 while preventing alteration and deterioration of the first base member 21 and the second base member 22 reliably.

Further, a heating time is set to a time for generating the cleavage within the bonding film 3. Specifically, the time is preferably in the range of about 10 to 180 minutes, and more preferably in the range of about 30 to 60 minutes, although being slightly different depending on the heating temperature, the constituent material of the bonding film 3, and the like.

In this regard, the method of applying the energy for bonding to the bonding film 3 and the method of applying the energy for separation thereto may be the same or different from each other, but it is preferred that they are the same. Since the magnitude of the energy for bonding and the magnitude of the energy for separation are controlled relatively easily, in the case where the same method is used, the magnitude of the energy for separation can be easily adjusted so as to become larger than that of the energy for bonding.

Further, these energies can be applied to the bonding film 3 using a single apparatus, namely the manufacture and separation of the bonded body 1 can be carried out using the single apparatus. This makes it possible to reduce a cost for manufacturing and separating the bonded body 1.

In this way, by using an easy method, that is, the above method of applying the energy for separation to the bonding film 3, the second base member 22 can be peeled off from the first base member 21 effectively. Therefore, even if the constituent materials of the base members 21 and 22 are different from each other, they can be reused independently after fractionation thereof. This makes it possible to improve the recycle rate of the bonded body 1.

Liquid Droplet Ejection Head

Now, description will be made on an embodiment of a liquid droplet ejection head in which the above mentioned bonded body is used.

Figure 6:
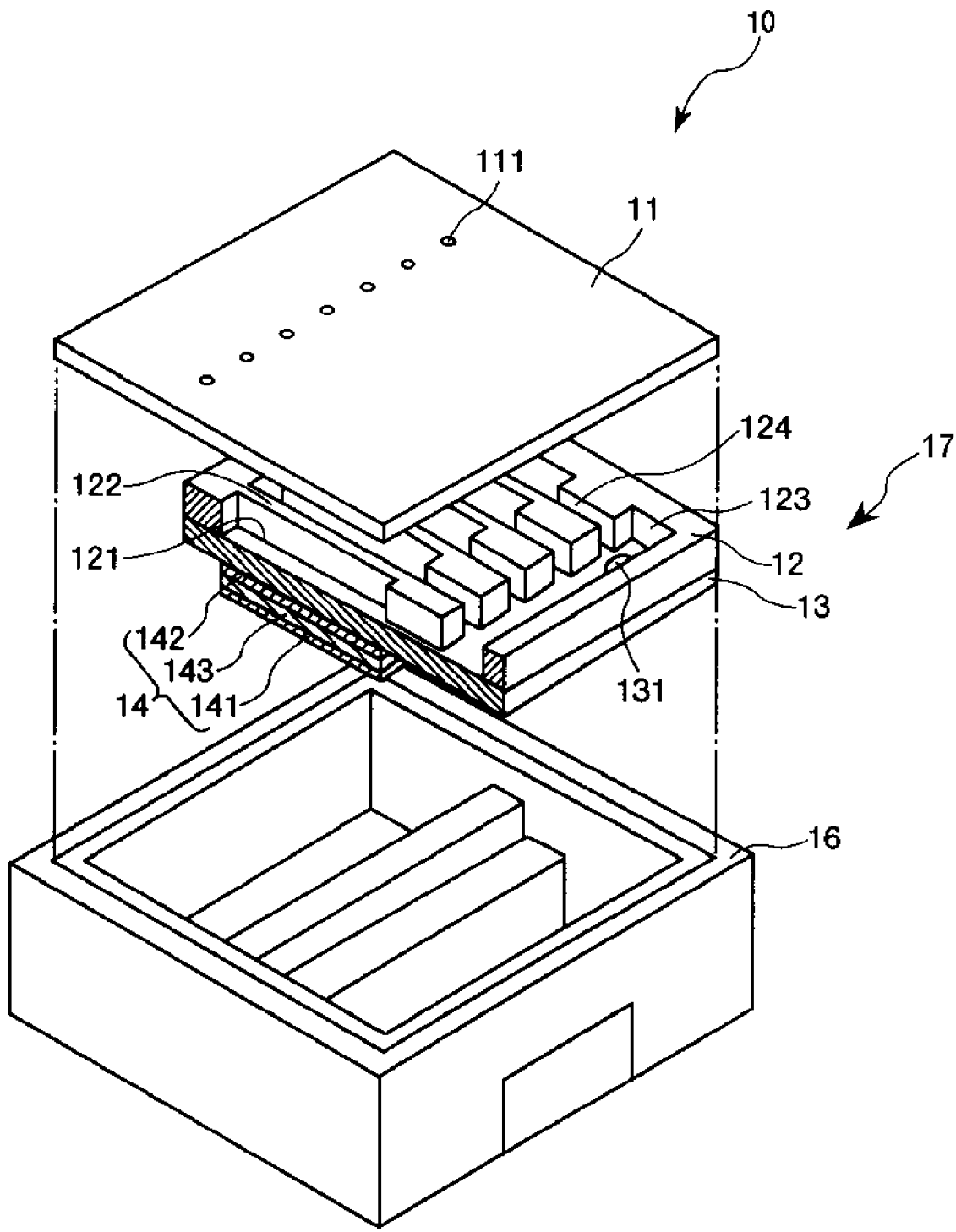
FIG. 6 is an exploded perspective view showing an ink jet type recording head (a liquid droplet ejection head) in which the bonded body is used.
Figure 7:
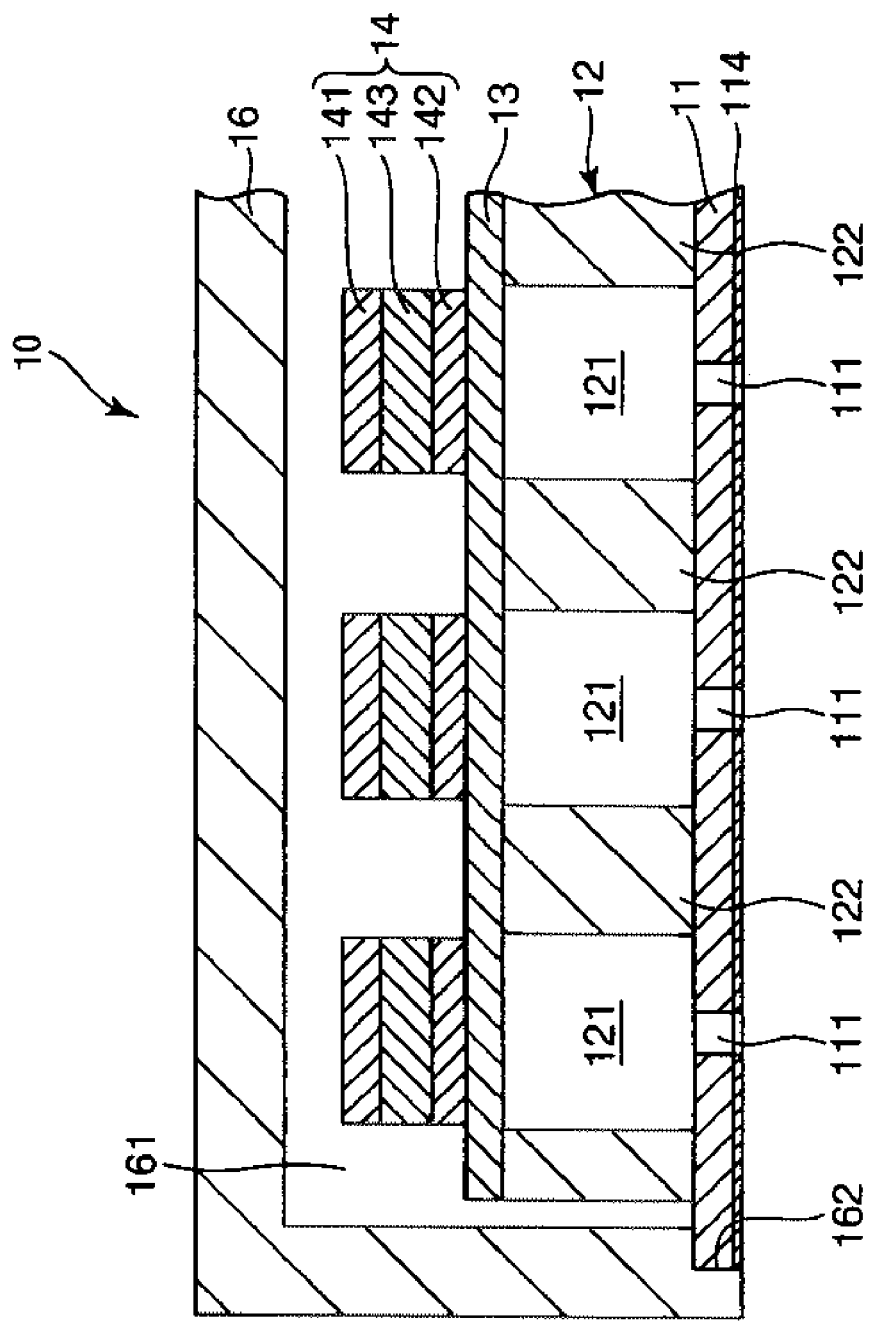
FIG. 7 is a section view illustrating a main portion of the ink jet type recording head shown in FIG. 6.
Figure 8:
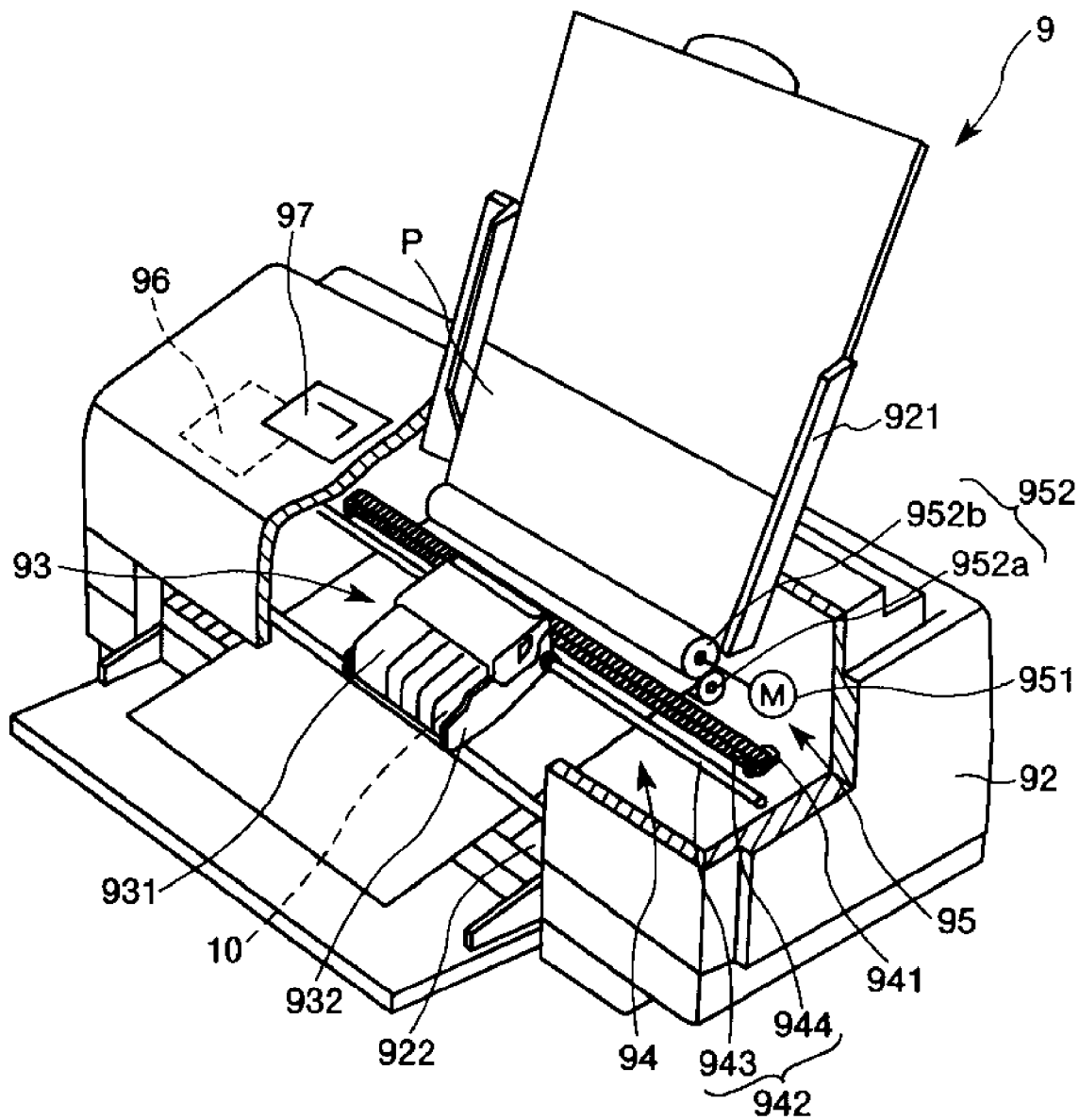
FIG. 8 is a schematic view showing one embodiment of an ink jet printer equipped with the ink jet type recording head shown in FIG. 6.

FIG. 6 is an exploded perspective view showing an ink jet type recording head (a liquid droplet ejection head). FIG. 7 is a section view illustrating a main portion of the ink jet type recording head shown in FIG. 6. FIG. 8 is a schematic view showing one embodiment of an ink jet printer equipped with the ink jet type recording head shown in FIG. 6. In FIG. 6, the ink jet type recording head is shown in an inverted state as distinguished from a typical use state.

The ink jet type recording head 10 shown in FIG. 6 is mounted to the ink jet printer 9 shown in FIG. 8.

The ink jet printer 9 shown in FIG. 8 includes a printer body 92, a tray 921 provided in an upper rear portion of the printer body 92 for holding recording paper sheets P, a paper discharging port 922 provided in a lower front portion of the printer body 92 for discharging the recording paper sheets P therethrough, and an operation panel 97 provided on an upper surface of the printer body 92.

The operation panel 97 is formed from, e.g., a liquid crystal display, an organic EL display, an LED lamp or the like. The operation panel 97 includes a display portion (not shown) for displaying an error message and the like and an operation portion (not shown) formed from various kinds of switches.

Within the printer body 92, there are provided a printing device (a printing means) 94 having a reciprocating head unit 93, a paper sheet feeding device (a paper sheet feeding means) 95 for feeding the recording paper sheets P into the printing device 94 one by one and a control unit (a control means) 96 for controlling the printing device 94 and the paper sheet feeding device 95.

Under control of the control unit 96, the paper sheet feeding device 95 feeds the recording paper sheets P one by one in an intermittent manner. The recording paper sheet P passes near a lower portion of the head unit 93. At this time, the head unit 93 makes reciprocating movement in a direction generally perpendicular to a feeding direction of the recording paper sheet P, thereby printing the recording paper sheet P.

In other words, an ink jet type printing operation is performed, during which time the reciprocating movement of the head unit 93 and the intermittent feeding of the recording paper sheets P act as primary scanning and secondary scanning, respectively.

The printing device 94 includes a head unit 93, a carriage motor 941 serving as a driving power source of the head unit 93 and a reciprocating mechanism 942 rotated by the carriage motor 941 for reciprocating the head unit 93.

The head unit 93 includes an ink jet type recording head 10 (hereinafter, simply referred to as "head 10") having a plurality of nozzle holes 111 formed in a lower portion thereof, an ink cartridge 931 for supplying an ink to the head 10 and a carriage 932 carrying the head 10 and the ink cartridge 931.

Full color printing becomes available by using, as the ink cartridge 931, a cartridge of the type filled with ink of four colors, i.e., yellow, cyan, magenta and black.

The reciprocating mechanism 942 includes a carriage guide shaft 943 whose opposite ends are supported on a frame (not shown) and a timing belt 944 extending parallel to the carriage guide shaft 943.

The carriage 932 is reciprocatingly supported by the carriage guide shaft 943 and fixedly secured to a portion of the timing belt 944.

If the timing belt 944 wound around a pulley is caused to run in forward and reverse directions by operating the carriage motor 941, the head unit 93 makes reciprocating movement along the carriage guide shaft 943. During this reciprocating movement, an appropriate amount of the ink is ejected from the head 10 to print the recording paper sheets P.

The paper sheet feeding device 95 includes a paper sheet feeding motor 951 serving as a driving power source thereof and a pair of paper sheet feeding rollers 952 rotated by means of the paper sheet feeding motor 951.

The paper sheet feeding rollers 952 include a driven roller 952a and a driving roller 952b, both of which face toward each other in a vertical direction, with a paper sheet feeding path (the recording paper sheet P) remained therebetween. The driving roller 952b is connected to the paper sheet feeding motor 951.

Thus, the paper sheet feeding rollers 952 are able to feed the plurality of the recording paper sheets P, which are held in the tray 921, toward the printing device 94 one by one. In place of the tray 921, it may be possible to employ a construction that can removably hold a paper sheet feeding cassette containing the recording paper sheets P.

The control unit 96 is designed to perform printing by controlling the printing device 94 and the paper sheet feeding device 95 based on printing data inputted from a host computer, e.g., a personal computer or a digital camera.

Although not shown in the drawings, the control unit 96 is mainly comprised of a memory that stores a control program for controlling the respective parts and the like, a piezoelectric element driving circuit for driving piezoelectric elements (vibration sources) 14 to control an ink ejection timing, a driving circuit for driving the printing device 94 (the carriage motor 941), a driving circuit for driving the paper sheet feeding device 95 (the paper sheet feeding motor 951), a communication circuit for receiving the printing data from the host computer, and a CPU electrically connected to the memory and the circuits for performing various kinds of control with respect to the respective parts.

Electrically connected to the CPU are a variety of sensors capable of detecting, e.g., a remaining amount of the ink in the ink cartridge 931 and a position of the head unit 93.

The control unit 96 receives the printing data through the communication circuit and then stores them in the memory. The CPU processes these printing data and outputs driving signals to the respective driving circuits, based on the data thus processed and data inputted from the variety of sensors. Responsive to these signals, the piezoelectric elements 14, the printing device 94 and the paper sheet feeding device 95 come into operation, thereby printing the recording paper sheets P.

Hereinafter, the head 10 will be described in detail with reference to FIGS. 6 and 7.

The head 10 includes a head main body 17 and a base body 16 for receiving the head main body 17. The head main body 17 includes a nozzle plate 11, an ink chamber base plate 12, a vibration plate 13 and a plurality of piezoelectric elements (vibration sources) 14 bonded to the vibration plate 13. The head 10 constitutes a piezo jet type head of on-demand style.

The nozzle plate 11 is made of, e.g., a silicon-based material such as $SiO_2$, SiN or quartz glass, a metal-based material such as Al, Fe, Ni, Cu or alloy containing these metals, an oxide-based material such as alumina or ferric oxide, a carbon-based material such as carbon black or graphite, and the like.

The plurality of the nozzle holes 111 for ejecting ink droplets therethrough are formed in the nozzle plate 11. A pitch of the nozzle holes 111 is suitably set according to a degree of printing accuracy.

The ink chamber base plate 12 is fixed or secured to the nozzle plate 11. In the ink chamber base plate 12, there are formed a plurality of ink chambers (cavities or pressure chambers) 121, a reservoir chamber 123 for reserving the ink supplied from the ink cartridge 931 and a plurality of supply ports 124 through which the ink is supplied from the reservoir chamber 123 to the respective ink chambers 121. These chambers 121, 123 and 124 are defined by the nozzle plate 11, side walls (barrier walls) 122 and the below mentioned vibration plate 13.

The respective ink chambers 121 are formed into a reed shape (a rectangular shape) and are arranged in a corresponding relationship with the respective nozzle holes 111. Volume of each of the ink chambers 121 can be changed in response to vibration of the vibration plate 13 as described below. The ink is ejected from the ink chambers 121 by virtue of this volume change.

As a base material of which the ink chamber base plate 12 is made, it is possible to use, e.g., a monocrystalline silicon substrate, various kinds of glass substrates or various kinds of resin substrates. Since these substrates are all generally used in the art, use of these substrates makes it possible to reduce a manufacturing cost of the head 10.

The vibration plate 13 is bonded to an opposite side of the ink chamber base plate 12 from the nozzle plate 11. The plurality of the piezoelectric elements 14 are provided on an opposite side of the vibration plate 13 from the ink chamber base plate 12.

In a predetermined position of the vibration plate 13, a communication hole 131 is formed through a thickness of the vibration plate 13. The ink can be supplied from the ink cartridge 931 to the reservoir chamber 123 through the communication hole 131.

Each of the piezoelectric elements 14 includes an upper electrode 141, a lower electrode 142 and a piezoelectric body layer 143 interposed between the upper electrode 141 and the lower electrode 142. The piezoelectric elements 14 are arranged in alignment with generally central portions of the respective ink chambers 121.

The piezoelectric elements 14 are electrically connected to the piezoelectric element driving circuit and are designed to be operated (vibrated or deformed) in response to the signals supplied from the piezoelectric element driving circuit.

The piezoelectric elements 14 act as vibration sources. The vibration plate 13 is vibrated by operation of the piezoelectric elements 14 and has a function of instantaneously increasing internal pressures of the ink chambers 121.

The base body 16 is made of, e.g., various kinds of resin materials or various kinds of metallic materials. The nozzle plate 11 is fixed to and supported by the base body 16. Specifically, in a state that the head main body 17 is received in a recess portion 161 of the base body 16, an edge of the nozzle plate 11 is supported on a shoulder 162 of the base body 16 extending along an outer circumference of the recess portion 161.

When bonding the nozzle plate 11 and the ink chamber base plate 12, the ink chamber base plate 12 and the vibration plate 13, and the nozzle plate 11 and the base body 16 as mentioned above, the above mentioned bonding method is used in at least one bonded portion thereof.

In other words, the above mentioned bonded body is used in at least one of a bonded body in which the nozzle plate 11 and the ink chamber base plate 12 are bonded together, a bonded body in which the ink chamber base plate 12 and the vibration plate 13 are bonded together, and a bonded body in which the nozzle plate 11 and the base body 16 are bonded together.

In such a head 10, two members constituting each of them are bonded together through the bonding film 3 in the bonded portion. Therefore, the head 10 exhibits increased bonding strength and chemical resistance in bonding interfaces (the bonded portion), which in turn leads to increased durability and liquid tightness against the ink reserved in the respective ink chambers 121. As a result, the head 10 is rendered highly reliable.

Furthermore, highly reliable bonding is available even at an extremely low temperature. There is an advantage that a head with an increased area can be fabricated from members made of materials having different linear expansion coefficients.

Moreover, in the case where the above bonded body is used in a part of the head 10, it is possible to manufacture a head 10 having high dimensional accuracy. Therefore, it is possible to control an ejecting direction of ink droplets ejected from the head 10, and a distance between the head 10 and each of the recording paper sheets P with high accuracy. This makes it possible to improve a quality of a printing recorded using the ink jet printer 9 provided with such a head 10.

When such a head 10 is recycled (deconstructed), by using the separating method of the present invention, it is possible to reliably separate at least one of the above bonded bodies such as the bonded body in which the nozzle plate 11 and the ink chamber base plate 12 are bonded together, the bonded body in which the ink chamber base plate 12 and the vibration plate 13 are bonded together, and the bonded body in which the nozzle plate 11 and the base body 16 are bonded together.

As a result, each of the bonded bodies is separated into the nozzle plate 11 and the ink chamber base plate 12, the ink chamber base plate 12 and the vibration plate 13, or the nozzle plate 11 and the base body 16. Since these members (these base members) can be recycled independently, it is possible to improve a recycle rate of the head 10.

With the head 10 set forth above, no deformation occurs in the piezoelectric body layer 143, in the case where a predetermined ejection signal has not been inputted from the piezoelectric element driving circuit, that is, a voltage has not been applied between the upper electrode 141 and the lower electrode 142 of each of the piezoelectric elements 14.

For this reason, no deformation occurs in the vibration plate 13 and no change occurs in the volumes of the ink chambers 121. Therefore, the ink droplets have not been ejected from the nozzle holes 111.

On the other hand, the piezoelectric body layer 143 is deformed, in the case where the predetermined ejection signal is inputted from the piezoelectric element driving circuit, that is, the voltage is applied between the upper electrode 141 and the lower electrode 142 of each of the piezoelectric elements 14.

Thus, the vibration plate 13 is heavily deflected to change the volumes of the ink chambers 121. At this moment, pressures within the ink chambers 121 are instantaneously increased and the ink droplets are ejected from the nozzle holes 111.

when one ink ejection operation has ended, the piezoelectric element driving circuit ceases to apply the voltage between the upper electrode 141 and the lower electrode 142.

Thus, the piezoelectric elements 14 are returned substantially to their original shapes, thereby increasing the volumes of the ink chambers 121.

At this time, a pressure acting from the ink cartridge 931 toward the nozzle holes 111 (a positive pressure) is imparted to the ink. This prevents an air from entering the ink chambers 121 through the nozzle holes 111, which ensures that the ink is supplied from the ink cartridge 931 (the reservoir chamber 123) to the ink chambers 121 in a quantity corresponding to the quantity of the ink ejected.

By sequentially inputting ejection signals from the piezoelectric element driving circuit to the piezoelectric elements 14 lying in target printing positions, it is possible to print an arbitrary (desired) letter, figure or the like.

The head 10 may be provided with thermoelectric conversion elements in place of the piezoelectric elements 14. In other words, the head 10 may have a configuration in which the ink is ejected using a thermal expansion of a material caused by the thermoelectric conversion elements (which is sometimes called a bubble jet method wherein the term "bubble jet" is a registered trademark).

In the head 10 configured as above, a film 114 is formed on the nozzle plate 11 in an effort to impart liquid repellency thereto. By doing so, it is possible to reliably prevent the ink droplets from adhering to peripheries of the nozzle holes 111, which would otherwise occur when the ink droplets are ejected from the nozzle holes 111.

As a result, it becomes possible to make sure that the ink droplets ejected from the nozzle holes 111 are reliably landed (hit) on target regions.

It is needless to say that the above bonded body can be used in other apparatuses than the liquid droplet ejection apparatus as described in the embodiment. Examples of the other apparatuses include a semiconductor apparatus, a MEMS, a microreactor and the like.

Although the separating method of the bonded body according to the present invention has been described above based on the embodiments illustrated in the drawings, the present invention is not limited thereto. If necessary, one or more arbitrary step may be added in the separating method of the bonded body according to the present invention.

EXAMPLES

Next, description will be made on a number of concrete examples of the present invention.

Example 1

First, a monocrystalline silicon substrate having a length of 20 mm, a width of 20 mm and an average thickness of 1 mm was prepared as a first base member. A quartz glass substrate having a length of 20 mm, a width of 20 mm and an average thickness of 1 mm was prepared as a second base member. Both the monocrystalline silicon substrate and the quartz glass substrate were subjected to a surface treatment using oxygen plasma.

Next, a liquid material having a viscosity of 18.0 mPa·s at 25° C. ("KR-251" produced by Shin-Etsu Chemical Co., Ltd.) was prepared. In this regard, the liquid material contained a silicone material composed of silicone compounds each having a polydimethylsiloxane chemical structure, and toluene and isobutanol as a solvent.

Then, the liquid material was ejected in the form of liquid droplets each having a volume of 5 pL onto a surface of the monocrystalline silicon substrate using an ink jet method, to form a liquid coating.

Next, the liquid coating was dried at normal temperature (25° C.) for 24 hours, to thereby obtain a bonding film having an average thickness of about 100 nm on the monocrystalline silicon substrate.

Then, an ultraviolet ray was irradiated on the bonding film formed on the monocrystalline silicon substrate under the following conditions.

Ultraviolet Ray Irradiation Conditions
Composition of atmospheric gas: air atmosphere
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes Next, the monocrystalline silicon substrate and the quartz glass substrate were laminated together so that the ultraviolet ray-irradiated surface of the bonding film and the surface-treated surface of the quartz glass substrate made contact with each other.

Then, the monocrystalline silicon substrate and the quartz glass substrate were heated at a temperature of 80° C. while compressing the same under a pressure of 3 MPa and were maintained for 15 minutes.

In this way, obtained was a bonded body (a laminated body) in which the monocrystalline silicon substrate and the quartz glass substrate were bonded together through the bonding film having a pattern being of a shape of an alphabetical capital "E".

In this regard, bonding strength between the monocrystalline silicon substrate and the quartz glass substrate was measured using a mechanical strength tester ("ROMULUS" produced by QUAD GROUP Inc.). As a result, the bonding strength was 10 MPa or more.

Thereafter, an ultraviolet ray was irradiated on the bonding film of the bonded body under the following conditions. As a result, the quartz glass substrate could be peeled off from the monocrystalline silicon substrate.

Ultraviolet Ray Irradiation Conditions
Composition of atmospheric gas: $N_2$ gas
Temperature of atmospheric gas: 20° C.
Pressure of atmospheric gas: atmospheric pressure (100 kPa)
Wavelength of ultraviolet ray: 172 nm
Irradiation time of ultraviolet ray: 30 minutes Example 2

A bonded body was manufactured in the same manner as in the Example 1, except that the first base member was changed to a stainless steel substrate from the monocrystalline silicon substrate, and the second base member was changed to a polyethylene substrate from the quartz glass substrate.

Like the Example 1, in this Example 2, the formed bonding film had an average thickness of about 100 nm. Further, bonding strength between the stainless steel substrate and the polyethylene substrate was 10 MPa or more.

Thereafter, an ultraviolet ray was irradiated on the bonding film of the bonded body in the same manner as in the Example 1. As a result, the polyethylene substrate could be peeled off from the stainless steel substrate.

Example 3

A bonded body was manufactured in the same manner as in the Example 1, except that the bonding film was also formed on the quartz glass substrate using the same method as employed in forming the bonding film on the monocrystalline silicon substrate, and the monocrystalline silicon substrate and the quartz glass substrate were bonded together through the bonding films formed thereon.

Like the Example 1, in this Example 3, each of the formed bonding films had an average thickness of about 100 nm. Further, bonding strength between the monocrystalline silicon substrate and the quartz glass substrate was 10 MPa or more.

Thereafter, an ultraviolet ray was irradiated on the bonding films of the bonded body in the same manner as in the Example 1. As a result, the quartz glass substrate could be peeled off from the monocrystalline silicon substrate.

Example 4

A bonded body was manufactured in the same manner as in the Example 1, except that a liquid material having a viscosity of 1.20 mPa·s at 25° C. ("KR-400" produced by Shin-Etsu Chemical Co., Ltd.) was used instead of the liquid material.

In this regard, the liquid material contained a silicone material composed of silicone compounds each having a polydimethylsiloxane chemical structure, and no solvent.

Like the Example 1, in this Example 4, the formed bonding film had an average thickness of about 100 nm. Further, bonding strength between the monocrystalline silicon substrate and the quartz glass substrate was 10 MPa or more.

Thereafter, an ultraviolet ray was irradiated on the bonding film of the bonded body in the same manner as in the Example 1. As a result, the quartz glass substrate could be peeled off from the monocrystalline silicon substrate.

Example 5

A bonded body was manufactured in the same manner as in the Example 1, except that the bonding film to be provided on the monocrystalline silicon substrate (the first base member) was formed using a plasma polymerization method. In this regard, it is to be noted that film forming conditions of the plasma polymerization method were as follows.

Film Forming Conditions
Composition of raw gas: octamethyl trisiloxane
Flow rate of raw gas: 50 sccm
Composition of Carrier gas: argon
Flow rate of carrier gas: 100 sccm
Flow rate of hydrogen gas: 0.2 sccm
Power of high frequency electricity: 100 W
Pressure within chamber: 1 Pa (low vacuum)
Processing time: 15 minutes
Temperature of substrate: 20° C.

Like the Example 1, in this Example 5, the formed bonding film had an average thickness of about 100 nm. Further, bonding strength between the monocrystalline silicon substrate and the quartz glass substrate was 10 MPa or more.

Thereafter, an ultraviolet ray was irradiated on the bonding film of the bonded body in the same manner as in the Example 1. As a result, the quartz glass substrate could be peeled off from the monocrystalline silicon substrate.

Example 6

A bonded body was manufactured in the same manner as in the Example 5, except that the bonding film was also formed on the quartz glass substrate using the same method as employed in forming the bonding film on the monocrystalline silicon substrate, and the monocrystalline silicon substrate and the quartz glass substrate were bonded together through the bonding films formed thereon.

Like the Example 1, in this Example 6, each of the formed bonding films had an average thickness of about 100 nm. Further, bonding strength between the monocrystalline silicon substrate and the quartz glass substrate was 10 MPa or more.

Thereafter, an ultraviolet ray was irradiated on the bonding films of the bonded body in the same manner as in the Example 1. As a result, the quartz glass substrate could be peeled off from the monocrystalline silicon substrate.

What is claimed is:

1. A separating method of a bonded body, the bonded body including a first base member, a second base member and a bonding film through which the first and second base members are bonded together, the bonding film containing a silicone material composed of silicone compounds, the separating method comprising:
    applying a liquid material containing the silicone material onto a surface of at least one of the first and second base members, to form a liquid coating on the surface;
    drying the liquid coating so that it is transformed into the bonding film on the surface of the at least one of the first and second base members;
    applying energy for bonding to the bonding film so that a bonding property is developed in the vicinity of a surface thereof, to thereby bond the first and second base members together through the bonding film to obtain the bonded body, wherein the applying the energy for bonding is performed by a method in which an ultraviolet ray having a wavelength of 126 to 172 nm is irradiated on the bonding film; and
    applying energy for separation to the bonding film so that cleavage is generated within the bonding film due to breakage of a part of molecular bonds of the silicone compounds, to thereby separate the bonded body into the first and second base members, wherein the applying the energy for separation is performed by both a method in which the ultraviolet ray having the wavelength of 126 to 172 nm is irradiated on the bonding film and a method in which the bonding film is heated at a temperature of 100 to 400° C.,
    wherein each of the silicone compounds has a polyorganosiloxane chemical structure having end portions,
    wherein the polyorganosiloxane chemical structure includes:
        first units at the both end portions of the polyorganosiloxane chemical structure, and
        second units for connecting the first units,
    wherein each of the first units is represented by the following general formula (1), and each of the second units is represented by the following general formula (2):

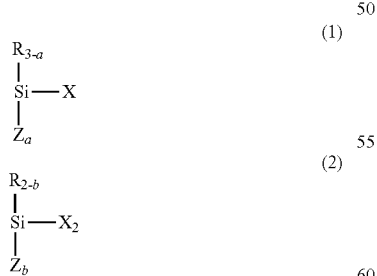

where each R is independently a substituted hydrocarbon group or an unsubstituted hydrocarbon group, each Z is independently a hydroxyl group or a hydrolysable group, each X is a siloxane residue, a is 0 or an integer of 1 to 3, and b is 0 or an integer of 1 to 2, wherein the surface of each of the first and second base members which makes contact with the bonding film has been, in advance, subjected to an ultraviolet ray irradiation treatment for improving bonding strength between each of the first and second base members and the bonding film, and
wherein magnitude of the energy for separation is larger than that of the energy for bonding.

2. The separating method as claimed in claim 1, wherein the applying the energy for bonding is further performed by a method in which the bonding film is heated and/or a method in which a compressive force is applied to the bonding film.

3. The separating method as claimed in claim 1, wherein in the second units, b is 0 and R is the unsubstituted hydrocarbon group including a methyl group.

4. The separating method as claimed in claim 1, wherein each of the silicone compounds has at least one silanol group.

5. The separating method as claimed in claim 1, wherein the applying the energy for separation is performed in an air atmosphere.

6. The separating method as claimed in claim 1, wherein an average thickness of the bonding film is in the range of 10 to 10,000 nm.

7. The separating method as claimed in claim 1, wherein at least a portion of each of the first and second base members which makes contact with the bonding film is composed of a silicon material, a metal material or a glass material as a major component thereof.

8. The separating method as claimed in claim 1,
wherein the polyorganosiloxane chemical structure is represented by the following general formula,

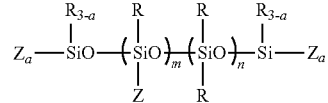

where each R is independently a substituted hydrocarbon group or an unsubstituted hydrocarbon group, each Z is independently a hydroxyl group or a hydrolysable group, a is 0 or an integer of 1 to 3, m is 0 or an integer of 1 or more, and n is an integer of 1 or more.

9. The separating method as claimed in claim 8, wherein each R is a methyl group and each Z is the hydroxyl group.

10. The separating method as claimed in claim 1, wherein the bonding film further contains octamethyltrisiloxane.

11. The separating method as claimed in claim 1, wherein the polyorganosiloxane chemical structure further includes:
third units connected to and branched from the second units,
    wherein each of the third units is represented by the following general formula (3):

where R is independently a substituted hydrocarbon group or an unsubstituted hydrocarbon group, Z is independently a hydroxyl group or a hydrolysable group, X is a siloxane residue, and c is 0 or 1.

12. The separating method as claimed in claim 11, wherein the bonding film further contains octamethyltrisiloxane.

* * * * *